US009693115B2

(12) United States Patent
Kitts et al.

(10) Patent No.: US 9,693,115 B2
(45) Date of Patent: *Jun. 27, 2017

(54) METHOD AND SYSTEM FOR AUTOMATICALLY DETERMINING DEMOGRAPHICS OF MEDIA ASSETS FOR TARGETING ADVERTISEMENTS

(71) Applicant: ADAP.TV, INC., Dulles, VA (US)

(72) Inventors: Brendan Kitts, Seattle, WA (US);
Brian Burdick, Newcastle, WA (US);
Dyng Au, Seattle, WA (US); Tyson Roberts, Sammamish, WA (US)

(73) Assignee: ADAP.TV, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,921

(22) Filed: Jul. 14, 2016

(65) Prior Publication Data
US 2016/0345042 A1  Nov. 24, 2016

Related U.S. Application Data

(63) Continuation of application No. 14/844,267, filed on Sep. 3, 2015, now Pat. No. 9,426,511, which is a
(Continued)

(51) Int. Cl.
*H04N 21/258* (2011.01)
*H04N 21/81* (2011.01)
*H04N 21/435* (2011.01)
*H04N 21/442* (2011.01)
*H04N 21/25* (2011.01)
(Continued)

(52) U.S. Cl.
CPC ......... *H04N 21/812* (2013.01); *H04N 21/252* (2013.01); *H04N 21/258* (2013.01); *H04N 21/25866* (2013.01); *H04N 21/25883* (2013.01); *H04N 21/25891* (2013.01); *H04N 21/2668* (2013.01); *H04N 21/435* (2013.01); *H04N 21/442* (2013.01); *H04N 21/44213* (2013.01); *H04N 21/4532* (2013.01); *H04N 21/4828* (2013.01)

(58) Field of Classification Search
CPC combination set(s) only.
See application file for complete search history.

(56) References Cited

U.S. PATENT DOCUMENTS 6,286,005 B1  9/2001  Cannon
8,046,797 B2  10/2011  Bentolila et al.
(Continued)

OTHER PUBLICATIONS

Tellis, G., Chandy, R., MacInnis, D., and Thaivanich, P. "Modeling the Microeffects of Television Advertising: Which Ad Works, When, Where, for How Long, and Why?" *Marketing Science* 24(3), pp. 351-366, @ 2005 INFORMS.
(Continued)

*Primary Examiner* — Kieu Oanh T Bui
(74) *Attorney, Agent, or Firm* — Bookoff McAndrews, PLLC

(57) ABSTRACT

Described herein is a system and method of ad targeting that automatically matches advertisements to media based on the demographic signatures of each. The method and system include calculating a match score between historical buyer demographics and media demographics. Media which is similar to the demographic of the product buyers is targeted for advertising.

20 Claims, 29 Drawing Sheets

Related U.S. Application Data continuation of application No. 14/336,384, filed on Jul. 21, 2014, now Pat. No. 9,161,099, which is a continuation of application No. 13/209,353, filed on Aug. 12, 2011, now Pat. No. 8,789,092.

(60) Provisional application No. 61/378,299, filed on Aug. 30, 2010, provisional application No. 61/372,974, filed on Aug. 12, 2010.

(51) Int. Cl.
*H04N 21/2668* (2011.01)
*H04N 21/482* (2011.01)
*H04N 21/45* (2011.01)

(56) References Cited

U.S. PATENT DOCUMENTS

| | | |
|---|---|---|
| 8,046,798 B1 | 10/2011 | Schlack et al. |
| 8,352,980 B2 | 1/2013 | Howcroft |
| 2003/0101451 A1 | 5/2003 | Bentolila et al. |
| 2008/0201731 A1 | 8/2008 | Howcroft |
| 2008/0235008 A1 | 9/2008 | Ito et al. |
| 2008/0235088 A1 | 9/2008 | Weyer et al. |
| 2009/0030780 A1 | 1/2009 | York et al. |
| 2009/0144801 A1 | 6/2009 | Grouf et al. |
| 2010/0231239 A1 | 9/2010 | Tateishi et al. |
| 2011/0040616 A1 | 2/2011 | Kannan et al. |
| 2011/0231243 A1 | 9/2011 | Bhatia et al. |
| 2011/0246267 A1 | 10/2011 | Williams et al. |
| 2011/0295680 A1 | 12/2011 | Shaw |
| 2011/0307326 A1 | 12/2011 | Hsiao et al. |
| 2012/0046996 A1 | 2/2012 | Shah |
| 2012/0185899 A1 | 7/2012 | Riedl et al. |

OTHER PUBLICATIONS

Smyth, B. and Cotter, P. "A Personalized Television Listings Service." *Communications of the ACM*, vol. 43, No. 8, Aug. 2000, pp. 107-111.

Spangler, W. Gal-Or, M., and May, J. "Using data mining to profile TV viewers." *Communications of the ACM*, vol. 46, Issue 12, Dec. 2003, pp. 66-72.

Arora, N. et al. "Putting one-to-one marketing to work: Personalization, customization, and choice." *Marketing Letters*, 2008, vol. 19, pp. 305-321.

Chorianopoulos, K., Lekakos, G. and Spinellis, D. "The Virtual Channel Model for Personalized Television." *Proceedings of th 1st EuroTV Conference: From Viewers to Actors*, 2003, pp. 59-67.

Lekakos, G. and Giaglis, G.M., "A Lifestyle-Based Approach for Delivering Personalized Advertisements in Digital Interactive Television." *Journal of Computer-Mediated Communication*, vol. 9, Issue 2, Jan. 2004, 14 pages.

Sutton, R.S. and Barto, A. G. *Reinforcement Learning: An Introduction*. Cambridge, MA. The MIT Press, 1998, Chapter 7, 32 pp. Retrieved from the Internet:<URL: http://webdocs.cs.ualberta.ca/~sutton/book/the-book.html>.

Bax, E. and Romero, J. "Comparing Predicted Prices in Auctions for Online Advertising." Technical Report, Caltech, 2009, pp. 1-27. Retrieved from the Internet: :<URL: http://www.jnromero.com/research/papers/Comparing%20Predicted%20Prices.pdf>.

Briggs, R. and Hollis N. "Advertising on the Web: Is There Response before Click-Through?" *Journal of Advertising Research*. Mar./Apr. 1997, pp. 33-45.

Brooks, N. "How Much Are You Paying for Your Customers' Navigational Behavior?" *Atlas Institute Digital Marketing Insight*, 2007, pp. 1-5. Retrieved from the Internet :<URL: http://www.atlassolutions.com/uploadedFiles/Atlas/Atlas_Institute/Published_Content/dmi-NavigationalSearch.pdf>.

Chandler-Pepelnjak, J. and Song, Y.B. "Optimal Frequency—The Impact of Frequency on Conversion Rates." *Atlas Institute Digital Marketing Insights*, 2003, pp. 1-4. Retrieved from the Internet :<URL: http://www.atlassolutions.com/uploadedFiles/Atlas/Atlas_Institute/Published_Content/OptFrequency.pdf>.

Chandler-Pepelnjak, J. "Measuring ROI beyond the Last Ad." *Atlas Institute Digital Marketing Insight*, 2009, pp. 1-6. Retrieved from the Internet :<URL: http://www.atlassolutions.com/uploadedFiles/Atlas/Atlas_Institute/Published_Content/dmi-MeasuringROIBeyondLastAd.pdf>.

Danaher, P. and Green, B. "A Comparison of Media Factors that Influence the Effectiveness of Direct Response Television Advertising." *Journal of Direct Marketing* (now *Journal of Interactive Marketing*), vol. 11, No. 2, 1997, pp. 46-

Google. "CPA Performance Trends on the Google Content Network," Google Inc., 2008, 7 pp. Retrieved from the Internet:<URL: http://www.google.com/ads/research/gcnwhitepaper/whitepaper.pdf>.

Google adWords Help. "What is the Conversion Optimizer and how does it work?" 2007, 1 p. Retrieved from the Internet:<URL: http://adwords.google.com/support/aw/bin/answer.py?hi=en&answer=60150>.

Kitts, B. "adCenter Announces new Conversion Tracking Options," adCenter Blog, Microsoft Advertising, Mar. 16, 2009, 9 pp. Retrieved from the Internet:<URL: http://community.microsoftadvertising.com/blogs/advertiser/advertiser/archive/2009/03/16/adcenter>.

Kitts, B., and LeBlanc, B. "Optimal Bidding on Keyword Auctions." Electronic Markets—The International Journal of Electronic Commerce and Business Media, vol. 14, No. 3, 2004, pp. 186-201.

Kitts, B., Freed, D., and Vrieze, M. "Cross-sell: A fast, promotion-tunable recommendation method based on conditionally independent probabilities." Sixth ACM SIGKDD International Conference on Knowledge Discovery and Data Mining, Boston, Aug. 20-23, 2000, 10 pp.

Kokernak, M. "What's Television's Next Business Model?" *Media Post Daily News*, Mar. 17, 2010, 3 pp. Retrieved from the Internet<URL: http://www.mediapost.com/publications/?fa=Articles.showArticle&art_aid=124424>.

IAB. "IAB Impression Measurement Guidelines," 2005, 20 pp. Retrieved from the Internet:<URL: http://www.lab.net/media/file/US_meas_guidelines.pdf>.

IAB. "Click Measurement Guidelines," 2009, 28 pp. Retrieved from the Internet:<URL:http://www.lab.net/media/file/click-measurement-guidelines2009.pdf>.

Leaders. "In Praise of Television: The great survivor." *The Economist*, Apr. 29, 2010, 2 pp. Retrieved from the Internet <URL: http://www.economist.com/node/16009155/print>.

Lowen, I. "Direct Marketers Increase Use of TV, Radio." *National Underwriter*, Jul. 19, 1985, pp. 10-11, 26.

Microsoft Advertising adCenter Help. "Microsoft adCenter click Measurement: Description of Methodology (DOM)." [last retrieved on Aug. 27, 2010], 1 p. Retrieved from the Internet<URL: http://adcenterhelp.microsoft.com/Help.aspx?market=en-US&project=adCenter_live_Std&guerytype=topic&guery=MOONSHOT_CONC_ClickMethod.htm>.

Moe, W. and Fader, P. "Dynamic Conversion Behavior at E-Commerce Sites." *Management Science*, vol. 50, No. 3, Mar. 2004, pp. 326-335. Retrieved from the Internet:<URL: http://citeseerx.ist.psu.edu/viewdoc/download?doi=10.1.1.23.1139&rep=rep1&type=pdf>.

Rey, B. and Kannan, A. "Conversion Rate Based Bid Adjustment for Sponsored Search Auctions." Yahoo! Labs Technician Report No. YL-2010-002, In Proceedings of the 19th International World Wide Web Conference, 2010, 14 pp.

Rimm-Kaufman, A. "PPC and Your Good Name: Sales From Brand Searches Aren't Incremental," May 27, 2007, 9 pp. Retrieved from the Internet:<URL: http://searchengineland.com/ppc-and-your-good-name-sales-from-brand-searches-arent -incremental-10825>.

(56) References Cited

OTHER PUBLICATIONS

Sculley, D., Malkin, R.G., Basu, S., and Bayardo, R.J. Predicting bounce rates in sponsored search advertisements, In Proceedings of the 15$^{th}$ ACM SIGKDD International Conference on Knowledge Discovery and Data Mining, Jun. 28-Jul. 1, 2009, Paris, France, pp. 1325-1333. Retrieved from the Internet:<URL: http://kissen.informatik.unidortmund.de/PROCEEDINGS/SIKDD2009/docs/p1325.pdf>.

Spencer, S. "Google deems Cost Per Action the Holy Grail." *CNET News*, Aug. 22, 2007, 2 pp. Retrieved from the Internet:<URL: http://news.cnet.com/8301-13530_3-9764601-28.html>.

Strong, E. "Search Conversion Rates by Daypart." *Atlas Digital Marketing Insight*, 2009, 4 pp. Retrieved from the Internet:<URL: http://www.atlassolutions.com/uploadedFiles/Atlas/Atlas_Institute/Published_Content/Search%20Conversion%20Rates%20by%20Daypart.pdf>.

Kitts, B., Wei, L., Au, D., Zlomek, S., Brooks, R., Birdick, B. (2010). "Targeting Television Audiences using Demographic Similarity." Applications of Data Mining and Modeling in Government and Industry Workshop (ADMMG12010) in Workshop Proceedings of the Tenth IEEE International Conference on Data Mining (ICDM), IEEE Computer Society Press, pp. 1391-1399.

Kitts, B., Wei, L., Au, D., Powter, A., Burdick, B. (2010). "Attribution of Conversion Events to Multi-Channel Media." Proceedings of the Tenth IEEE International Conference on Data Mining, Dec. 14-17, 2010, IEEE Computer Society Press, pp. 881-886.

"Lucid Insiders." Lucid Commerce company blog, posted Jul. 2, 2010 to Mar. 27, 2011, 19 pp. Retrieved from the Internet:<URL: http://blog.lucidcommerce.com>, accessed Dec. 8, 2011.

Non-Final Office Action from related U.S. Appl. No. 13/209,346, mailed Apr. 12, 2013, 11 pages.

Non-Final Office Action from related U.S. Appl. No. 13/221,851, mailed May 3, 2013, 26 pages.

Non-Final Office Action from related U.S. Appl. No. 13/221,865, mailed Aug. 1, 2013, 22 pages.

Final Office Action from related U.S. Appl. No. 13/221,851, mailed Oct. 10, 2013, 26 pages.

Notice of Allowance from related U.S. Appl. No. 13/209,346, mailed Apr. 12, 2013, 25 pages.

```
76219121|30|STY1|1|WKBW|BUFFALO,NY|2|7/2/2008 6:05|-5|8008768156|-1|www.webaddress.com|-1|235|2
76219112|120|STY2|1|WKBW|BUFFALO,NY|2|7/2/2008 6:05|-5|8008768156|-1||-1|0|3
76509063|30|STY4|1|WSBK|BOSTON,MA|2|7/4/2008 12:00|-5|8005951927|-1|www.webaddress.com|-1|0|4
76512444|60|STY4|1|WSBK|BOSTON,MA|2|7/4/2008 12:00|-5|8005951927|-1|www.webaddress.com|-1|197.4|4
76547095|120|STY3|1|KRON|SAN FRANCISCO,CA|2|7/4/2008 20:00|-8|8005938224|-1|www.webaddress.com|-1|0|4
76506696|30|STY4|1|XHAB|BROWNSVILLE,TX|2|7/5/2008 14:00|-6|8005951927|-1|www.webaddress.com|-1|188|4
76509047|30|STY4|1|WNUV|BALTIMORE,MD|2|7/5/2008 15:30|-5|8005952118|-1||-1|526.4|2
76509118|60|STY4|1|WTVZ|NORFOLK,VA|2|7/5/2008 16:00|-5|8005953110|-1||-1|310.2|2
76482379|120|STY3|1|WCSC|CHARLESTON,SC|2|7/5/2008 17:30|-5|8005938224|-1||-1|408.9|3
```

Sample Media Plan Data

*FIG. 1.1*

"Encoding Id","Market","Rank","Station","Channel","Affiliate","Start Date","Start Time","Stop Date","Stop Time","Start Second","Stop Second","Seconds","Program","ISCI-20","Campaign","Advertiser","Product Name","Module Code","Phone Number","Length","Donovan Agency Estimate Code","Donovan Agency Advertiser Code","Donovan Agency Product Code",
"0000708920","BANGOR","154","WFVX","022","FOX","20100714","14:30:05","20100714","14:58:33","0000000030","0000001738","00000 01835","PAID PROGRAM","PMSON001","SON2010","POSITEC USA","SONICRAFTER","1710","9999999999","1710","XXXX","XXXX","XXXX"

Sample Verification Data

*FIG. 1.2*

KXLY Spokane Q2 Order – GraveDigger2000

| FROM | Portia Veneto<br>Proceed Media Group | TO | KXLY Spokane | Revision No<br>Notes: | | DATE 6/5/2010 2:58 PM<br>Order ID 282 |
|---|---|---|---|---|---|---|
| Phone: 888-330-6975 x123<br>Fax: 206-682-1097 | | Phone: 345-456-6789<br>Fax: 345-456-9876 | | | | PAGE 1 of 1 |

Proceed Media Group

Client: Vorick Inc.  Separation between spots: 15  Flight Start Date: 6/28/2010 5:00:00 AM
Product: GraveDigger2000                              Flight End Date: 9/26/2010 4:59:00 AM
Market: Spokane Estimate Comments: Do not run ads, religious, or paid programming. Please offer MG within flight. Fair & equal rotation required.

| Item No. | Daypart Program | Station Gross | TFN | Rotation | Length | July 2010 6/28 | 7/5 | 7/12 | 7/19 | 7/26 | August 2010 8/2 | 8/9 | 8/16 | 8/23 | 8/30 | September 2010 9/6 | 9/13 | 9/20 | Total Spots | Total Cost |
|---|---|---|---|---|---|---|---|---|---|---|---|---|---|---|---|---|---|---|---|---|
| 3255 | M Tu W Th F 5:00am-9:00am | $300.00 | (800) 445-2999 | 100% | 60 | 4 | 4 | | | | 4 | | | | | | | | 12 | $3,600.00 |
| 3256 | M Tu W Th F Sa Su 6:00am-6:00pm | $110.00 | (800) 333-4434 | 100% | 120 | 20 | | | | | | 10 | | | | | | | 30 | $3,300.00 |
| 3257 | Su 10:00am-1:30pm | $280.00 | (800) 445-2999 | 100% | 60 | 1 | | | | | | | | | | | | | 1 | $280.00 |
| 3258 | Sa Su 1:00pm-6:00pm | $100.00 | (800) 445-2999 | 100% | 60 | | 5 | 5 | 5 | 5 | | | | | | | | | 25 | $2,500.00 |
| 3243 | M Tu W Th F Sa Su 11:00pm-2:00am | $1,500.00 | (800) 445-2999<br>(800) 448-7888 | 50%<br>50% | 60 | | 5 | 5 | 5 | 5 | 5 | 5 | 5 | 5 | 5 | 5 | 5 | 5 | 65 | $97,500.00 |
| 3245 | Sa Su 11:35p-12:35am | $650.00 | (800) 445-2999 | 100% | 60 | 5 | 5 | 5 | 5 | 5 | 5 | 5 | 5 | 5 | 5 | 5 | 5 | 5 | 65 | $42,250.00 |
| | Totals | | | | | 35 | 10 | 14 | 10 | 14 | 10 | 20 | 10 | 15 | 15 | 15 | 15 | 15 | 142 | $143,350.00 |
| | | | | | | $45,400.00 | | | | | $54,950.00 | | | | | $43,000.00 | | | | |

| Program | TFN | ISCI | Length |
|---|---|---|---|
| GraveDigger2000 | (800) 445-2999 | PMSW0002 | 60 |
| GraveDigger2000 | (800) 446-7888 | PMSW0003 | 60 |
| GraveDigger2000 | (800) 333-4434 | PMSW0044 | 120 |

Proceed Media Group is not responsible for any spots that do not run according to these instructions. Credit needed if spots air outside PMG Guidelines.

Please notify Proceed Media Group immediately if any programming changes or preemptions occur.

Please sign: _____  Date: _____

Scan and email to: pveneto@proceedmediagroup.com or fax to 206-682-1097. Questions or concerns: call Portia Veneto at 888-330-6975 x123.

Sample Traffic Instructions

*FIG. 1.3*

```
1555528362836|1|07/20/2008 13:30|-5|59535|v.32|635|25|4|8008195404|WAXN|330|STY6|||JOHN SMITH|15155 REDROAD CT||CHARLOTTE|NC|28273|US||||||404|6412622|jsmith@yahoo.com|100.00|2.50|1.50|Y|N
1555567168|1|07/20/2008 13:31|-5|60420|v.32|282|25|4|8008195404|WRNN|330|STY6||||||||||||||||||||
1555533396|1|07/20/2008 13:31|-5|52137|v.32|270|25|5|8008195404|WRNN|330|STY6||||||||||||||||||||
1555595953|1|07/20/2008 13:32|-5|66488|v.32|913|25|6|8009874524|HGTVC|330|STSC|||JOE|SAMPLE|1891FEATHER LIGHT WAY||WINDSOR|ON|N9H2E6|CA||||||519|5641186|joesample@hotmail.com|25|2.5|.5|N|N
1555579765|1|07/20/2008 13:34|-5|3104|v.32|553|25|6|8008195404|WAXN|330|STY6|||ERICA|TESTLASTNAME|4814 TEST AVE||CHARLOTTE|NC|28205|US||||||704|5375838|etestlastname@aol.com|100.00|2.50|1.50|Y|Y
1555585913|1|07/20/2008 13:35|-5|62707|v.32|1441|25|6|8008195404|WRNN|330|STY6|||AMANDA|JONES|63 E. BLACKBOX STREET||DOVER|NJ|07801|US|amanda jones|123 Main Ave||Portland|ME|04103|US|973|4429729|130.00|2.50|Y|N
1555540393|1|07/20/2008 13:35|-5|76294|v.32|81|25|4|8008195404|WRNN|330|STY6||||||||||||||||||||
1555585919|1|07/20/2008 13:36|-5|67793|v.32|1356|25|2|8008195404|WAXN|330|STY6|||JOHN|DOE|921 TASSO AVE||KANNAPOLIS|NC|28083|US||||||931|9381878|25.00|2.50|.50|N|N
1555585943|1|07/20/2008 13:37|-5|68041|v.32|103|25|4|8008195404|WRNN|330|STY6|||JANE|DOE||||||||||||||||
1555540442|1|07/20/2008 13:38|-
5|50392|v.32|365|300|4|8008195404|WAXN|330|STY6|||JANE|DOE|||||||||||||||||
```

Sample Callcenter Data

*FIG. 1.4*

```
09032000009MLH9AH-EC|02/01/2009 00:00|-7|www.samplewebsite.com|Unassigned|Jane|Doe|1234 Main St||BALTIMORE|MD|21224|US|John|Doe|4321 Main Ave||BALTIMORE|MD|21224|US|410|3827626|janedoe_1234@hotmail.com|100.00|2.50|1.50|Y|N
09032000141MT2QAH-EC|02/01/2009 00:01|-7|www.samplewebsite.com|ca-1|Jane|Doe|1234 Main St||WASHINGTON|MO|63090|US|||||||100.00|2.50|1.50|Y|N
09032000146MN95AH-EC|02/01/2009 00:01|-7|www.samplewebsite.com|ca-1|Jane|Doe|1234 Main St||STONE MOUNTAIN|GA|30083|US||||STONE MOUNTAIN|GA|30083|US|678|4997605|janedoe_1234@hotmail.com|100.00|2.50|1.50|Y|Y
09032000236MLH9AH-EC|02/01/2009 00:02|-7|www.samplewebsite.com|ca-1|Jane|Doe|1234 Main St||WEST DES MOINES|IA|50266|US||||WEST DES MOINES|IA|50266|US|515|2746587|janedoe_1234@hotmail.com|25.00|2.50|.50|N|N
09032000758MKSRAH-EC|02/01/2009 00:07|-7|www.samplewebsite.com|ca-1|Jane|Doe|1234 Main St||BALTIMORE|MD|21201|US||||MD|21201|US||||25|0|1|N|N
09032000857S383ER-EC|02/01/2009 00:08|-7|www.samplewebsite.com|ca-2|Jane|Doe|1234 Main St||BALTIMORE|MD|21201|US||||US||||25|0|1|Y|Y
09032001051MKSRAH-EC|02/01/2009 00:10|-7|www.samplewebsite.com|Unassigned|Jane|Doe|1234 Main St||BALTIMORE|MD|21201|US|||||US|||100.00|2.50|1.50|Y|N
09032001213MKSRAH-EC|02/01/2009 00:12|-7|www.samplewebsite.com|Unassigned|Jane|Doe|1234 Main St||BALTIMORE|MD|21201|US|||||21201|US|410|3827626||100.00|2.50|10.50|Y|N
09032001344S383ER-EC|02/01/2009 00:13|-7|www.samplewebsite.com|Unassigned|Jane|Doe|1234 Main St||LANCASTER|CA|93534|US||||LANCASTER|CA|93534|US|661|9405051|janedoe_1234@hotmail.com|100.00|2.50|10.50|Y|N
09032001719417S5ER-EC|02/01/2009 00:17|-7|www.samplewebsite.com|Unassigned|Jane|Doe|1234 Main St||FRESNO|CA|93650|US||||FRESNO|CA|93650|US|559|2928228|janedoe_1234@hotmail.com|30.00|2.50|1.50|Y|N
```

Sample E-Commerce Data

*FIG. 1.5*

```
00001893|02/14/2009 00:00|0|119.80|39.90|0.00|0.00|159.70|N|N|830|107633251|00001893|JIM |DOE|260 TRIAL
DR||BLOOMINGDALE|GA|31302-4058|US|912|6755172||00001893|JOHN|DOE|260 TRIAL
DR||BLOOMINGDALE|GA|31302-4058|US|912|555172|
00001894|02/14/2009 00:00|0|149.70|55.80|0.00|0.00|205.50|N|N|830|107633256|00001894|JANE|DOE|114 TEST
DR||SPRINGFIELD|GA|31329-4642|US|912|6559332||00001894|JANE|DOE|406 BILLINGADDRESS
AVE||GUYTON|GA|31312-4538|US|912|5559332|
```

Sample Order Data

*FIG. 1.6*

```
85189|JOHN|DOE|111 TEST
WAY|SEATTLE|WA|91045|35|M|D|1|0|0|1|0|323|23|234|1|5|1|1|0|1|0|1|0|0|1|0|1|0|1|1|43|Y|7|0|||1|
0|32||||0|1|1|0|7|X||||0|0|1|0|0|0|1
85189|JANE|SMITH|111 TEST
WAY|SEATTLE|WA|91045|35|M|D|1|0|0|1|0|323|23|234|1|5|1|1|0|1|0|1|0|0|1|0|1|0|1|1|43|Y|7|0|||1|
0|32||||0|1|1|0|7|X||||0|0|1|0|0|0|1
```

Sample Consumer Data Enrichment

*FIG. 1.7*

"03072010","0035","WABC","ABC","FPB","0060","Syndicated","Lost",,"Live Together, Die Alone","","","Drama","Jack Bender","","Naveen Andrews","Henry Ian Cusick","Emilie de Ravin","Michael Emerson","Matthew Fox","Jorge Garcia","Jack and Sayid devise a plan to confront the Others and get Walt back; Eko and Locke fight over the decision about the button and the hatch","","Closed Captioned","ESP,Part 1 of 2","","In Stereo",,,"14","V"
"03072010","0135","WABC","ABC","FPB","0115","Movie","Spliced","","","*+","2002","Horror","Gavin Wilding",,"Canada","Ron Silver","Liane Balaban","Drew Lachey","Melissa Repka",,,"A teenager watches a scary movie, then realizes the deformed killer from the film is stalking her","","","","","R","Adult language, adult situations, violence","",""
"03072010","0330","WABC","ABC","FPB","0030","Syndicated","Storm Stories","","","","","Weather","","Jim Cantore","",,,,,"True accounts of life-threatening, weather-related events","","Closed Captioned",,,"In Stereo",,,"PG",""
"03072010","0400","WABC","ABC","FPB","0030","Instructional","Ron Hazelton's HouseCalls",,,,,"Educational","","Ron Hazelton","",,,,,"Redefining an oversized living room into two more livable spaces using knee walls and columns; blending a hardwood floor","","Closed Captioned","","","In Stereo",,,"G",""
"03072010","0430","WABC","ABC","FPB","0030","Syndicated","Storm Stories","","","","","Weather","","Jim Cantore","",,,,,"True accounts of life-threatening, weather-related events","","Closed Captioned","","","In Stereo",,,"PG",""
"03072010","0500","WABC","ABC","FPB","0060","Special","Road to Gold: An Academy Award Preview","","","","","Entertainment","","Sandy Kenyon","",,,,,"A preview of the Oscars presentation",,"Closed Captioned",,,"In Stereo",,,"PG",""

Sample Guide Data

*FIG. 1.8*

| Runtime | Property | Product Purchased Key | Zip Code | Net Customer Value | Panelist ID | Age in Two Year Increments-1st Individual ID | Business Owners@ Home Indicator ID | Charitable Giving Score ID | Child Near High School Graduation in HHID | Cluster ID | College Graduate ID | Congressional District ID | Dwelling Type ID | Education -1st Individual ID |
|---|---|---|---|---|---|---|---|---|---|---|---|---|---|---|
| 1899-12-30 14:30:00.000 | CRT5 | 400 | 97152 | $100.00 | 10101 | 18 | NULL | 83 | NULL | 15 | NULL | 6 | 2 | 3 |
| 1899-12-30 11:00:00.000 | TRUTV | 400 | 87152 | $37.00 | 10102 | 17 | NULL | 43 | NULL | 16 | NULL | NULL | 2 | NULL |
| 1899-12-30 11:00:00.000 | TRUTV | 400 | 48313 | $321.00 | 10104 | NULL | NULL | 45 | NULL | 41 | NULL | 4 | 2 | NULL |
| 1899-12-30 06:00:00.000 | WWJ | 400 | 73737 | $12.31 | 10105 | 19 | NULL | 46 | NULL | 1 | NULL | 10 | 2 | 2 |
| 1899-12-30 16:30:00.000 | LP1 | 400 | 97152 | $19.95 | 10106 | 12 | NULL | 21 | NULL | 4 | NULL | 2 | 2 | 2 |
| 1899-12-30 11:30:00.000 | REELZ | 400 | 87152 | $119.32 | 10114 | 24 | NULL | 94 | NULL | 29 | NULL | 17 | 2 | 3 |
| 1899-12-30 06:30:00.000 | FOOD | 400 | 78252 | $37.15 | 10112 | 21 | NULL | 42 | NULL | 23 | NULL | 7 | 2 | NULL |
| 1899-12-30 09:30:00.000 | KTTV | 400 | 48313 | $231.11 | 10110 | 17 | NULL | 94 | NULL | 22 | NULL | 41 | 2 | 1 |
| 1899-12-30 08:30:00.000 | WDCA | 400 | 73737 | $901.11 | 10108 | 18 | NULL | 69 | NULL | 7 | NULL | 5 | 2 | 1 |

Sample Viewer Panel Data

*FIG. 1.9*

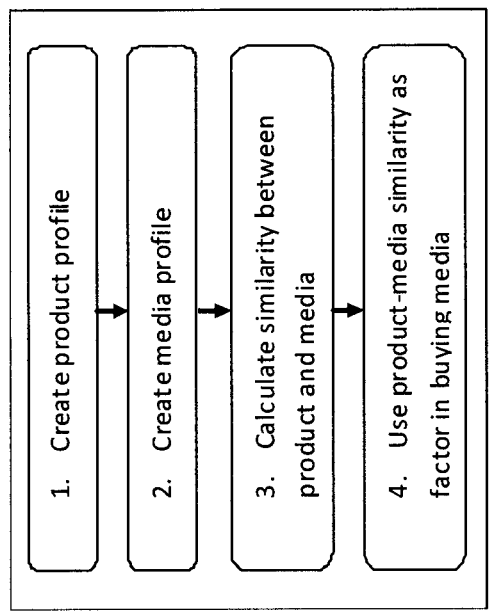
FIG. 1.10

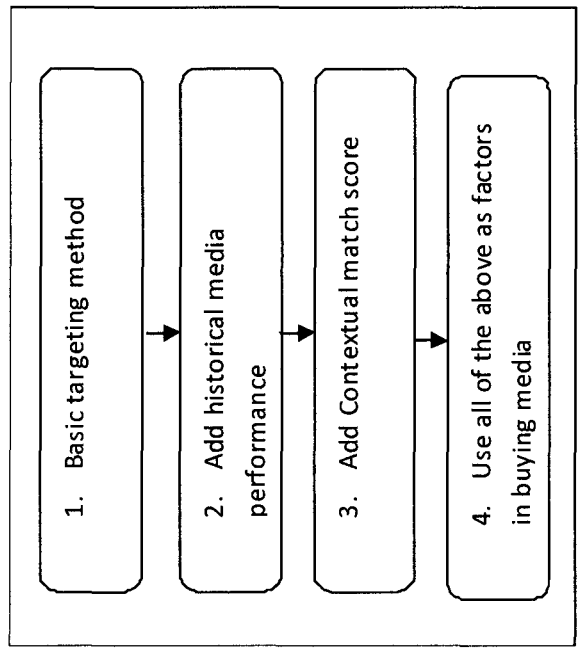
FIG. 1.11

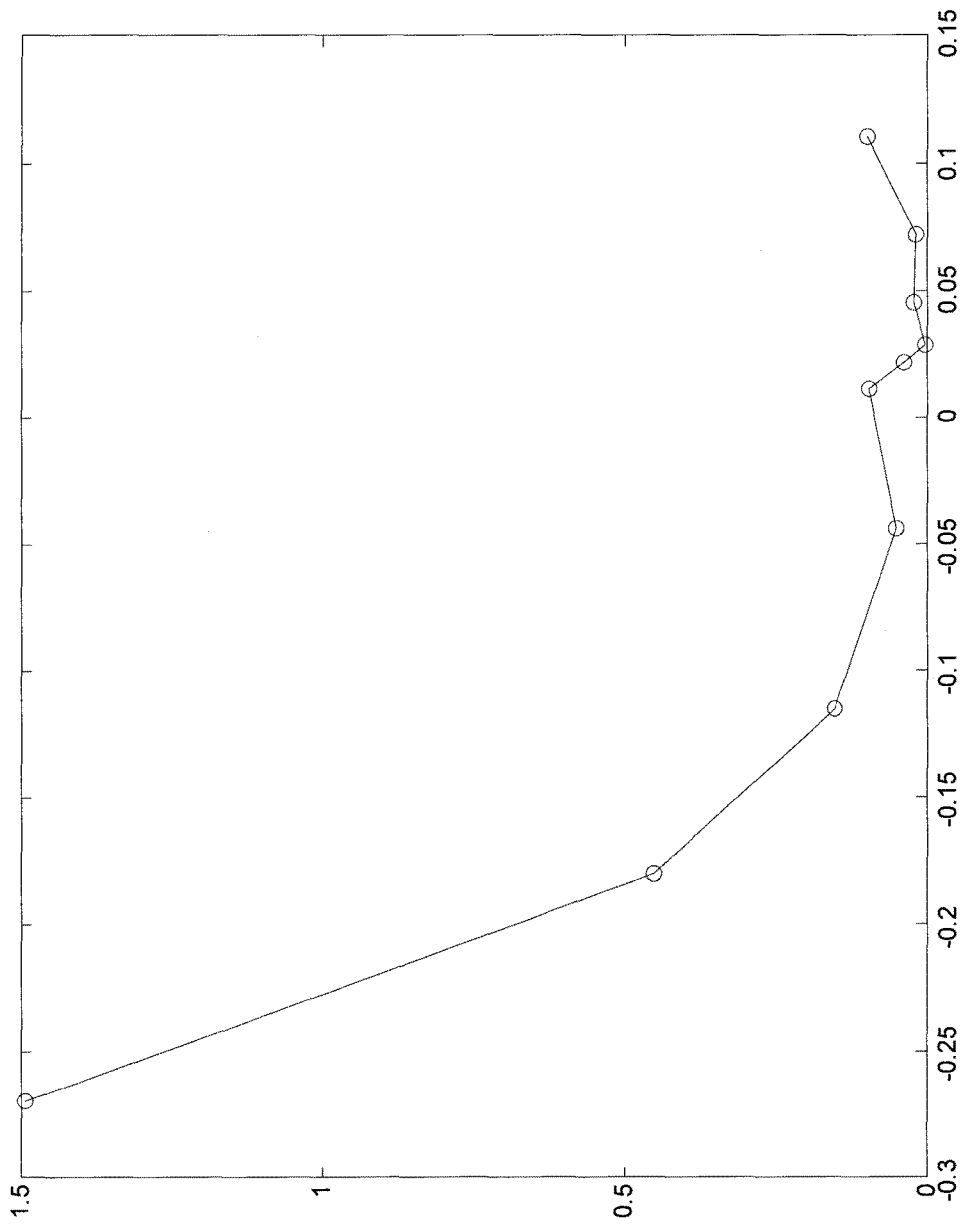
FIG. 1.12

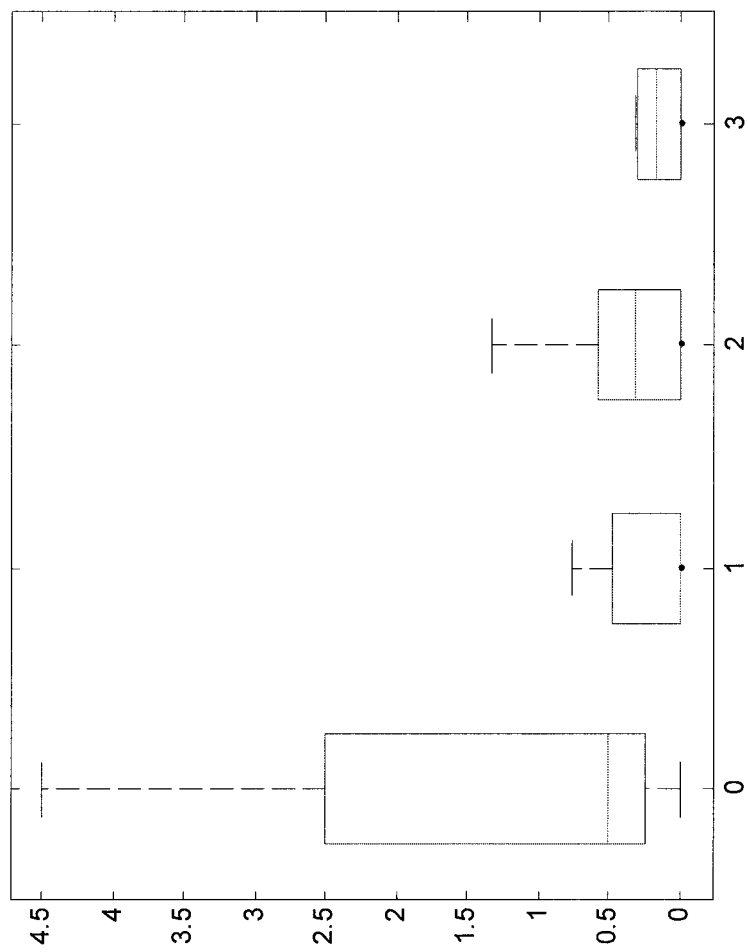
FIG. 1.13
Box-plot of Phone orders per airing by quartile of similarity score.
The closest similarity score has the largest average orders per airing, although there is also widest in terms of preformance.

| Overall Rank | Source Detail | Source Rank | Media Asset Pattern Type | Media Asset Pattern |
|---|---|---|---|---|
| 1 | Overall | 1 | Distributor - Rotation | CNBC - M-F - 3p-6p |
| 2 | Overall | 2 | Distributor - Rotation | CNBC - M-F - 9a-3p |
| 3 | Overall | 3 | Distributor - Rotation | KIMO - M-F - 6p-8p |
| 4 | Overall | 4 | Distributor - Rotation | GOLF - M-F - 3p-6p |
| 5 | Overall | 5 | Distributor - Rotation | GOLF - M-F - 9a-3p |
| 6 | Overall | 6 | Distributor - Rotation | GOLF - M-F - 6p-8p |
| 7 | Overall | 7 | Distributor - Rotation | CNBC - M-F - 6p-8p |
| 8 | Overall | 8 | Distributor - Rotation | GOLF - Sa-Su - 9a-8p |
| 9 | Overall | 9 | Distributor - Rotation | SPD - M-F - 9a-3p |
| 10 | Overall | 10 | Distributor - Rotation | WMMP - M-F - 9a-3p |
| 11 | Overall | 11 | Distributor - Rotation | CNBC - M-Su - 6a-9a |
| 12 | Overall | 12 | Distributor - Rotation | SPD - M-F - 3p-6p |
| 13 | Overall | 13 | Distributor - Rotation | MIL - M-Su - 8p-12a |
| 14 | Overall | 14 | Distributor - Rotation | GOLF - M-Su - 8p-12a |

| Row | Media Asset Pattern Type | Media Asset Pattern |
|---|---|---|
| 1 | Distributor – Rotation | STYL – M-Su – 6a-9a |
| 2 | Distributor – Rotation | LIF – M-Su – 12a-6a |
| 3 | Distributor – Rotation | STYL – M-Su – 12a-6a |
| 4 | Distributor – Rotation | LIF – M-Su – 6a-9a |
| 5 | Distributor – Rotation | ABC – M-F – 3p-6p |
| 6 | Distributor – Rotation | HGTV – M-F – 3p-6p |
| 7 | Distributor – Rotation | LMN – M-F – 9a-3p |
| 8 | Distributor – Rotation | LIF – M-F – 9a-3p |
| 9 | Distributor – Rotation | FOOD – M-F – 3p-6p |
| 10 | Distributor – Rotation | BET – M-Su – 6a-9a |
| 11 | Distributor – Rotation | WGNA – M-Su – 6a-9a |
| 12 | Distributor – Rotation | LMN – M-F – 3p-6p |
| 13 | Distributor – Rotation | TLC – M-Su – 6a-9a |
| 14 | Distributor – Rotation | HGTV – M-Su – 6a-9a |
| 15 | Distributor – Rotation | SOAP – M-F – 3p-6p |
| 16 | Distributor – Rotation | SOAP – M-Su – 6a-9a |
| 17 | Distributor – Rotation | SOAP – M-F – 9a-3p |
| 18 | Distributor – Rotation | LIF – M-Su – 8p-12a |

*FIG. 10*

| Overall Rank | Source Detail | Source Rank | Media Asset Pattern Type | Media Asset Pattern |
|---|---|---|---|---|
| 1 | Overall | 1 | Program | BARRETT-JACKSON-THE AUCTI |
| 2 | Overall | 2 | Program | NASCAR SPRINT CUP PRACTIC |
| 3 | Overall | 3 | Program | SQUAWK BOX 5A |
| 4 | Overall | 4 | Program | WEAPONOLOGY |
| 5 | Overall | 5 | Program | TOP TENS |
| 6 | Overall | 6 | Program | NASCAR NATIONWIDE PRACTIC |
| 7 | Overall | 7 | Program | ULTIMATE WEAPONS |
| 8 | Overall | 8 | Program | EUROPEAN TOUR |
| 9 | Overall | 9 | Program | CHAMPIONS TOUR |
| 10 | Overall | 10 | Program | SOUNDS OF NASCAR |

*FIG. 11*

| Cluster | Gender | customer Pct | | index Vs Avg | |
|---|---|---|---|---|---|
| Overall | Female | 32.10% | | (0.39) | |
| Overall | Male | 67.90% | | 0.42 | |

*FIG. 16*

| Cluster | Age | customer Pct | Index Vs Avg |
|---|---|---|---|
| Overall | 18-25 | 0.32% | (0.91) |
| Overall | 26-35 | 3.15% | (0.74) |
| Overall | 36-45 | 8.58% | (0.55) |
| Overall | 46-55 | 17.68% | (0.26) |
| Overall | 56-65 | 27.45% | 0.29 |
| Overall | 66-75 | 25.02% | 0.94 |
| Overall | 76+ | 17.80% | 1.42 |
| 1 | 18-25 | 0.00% | (1.00) |
| 1 | 26-35 | 0.00% | (1.00) |
| 1 | 36-45 | 0.16% | (0.99) |
| 1 | 46-55 | 4.45% | (0.81) |
| 1 | 56-65 | 25.22% | 0.19 |
| 1 | 66-75 | 37.72% | 1.92 |
| 1 | 76+ | 32.45% | 3.41 |
| 2 | 18-25 | 0.76% | (0.79) |
| 2 | 26-35 | 7.27% | (0.41) |
| 2 | 36-45 | 19.02% | 0.01 |
| 2 | 46-55 | 33.28% | 0.40 |
| 2 | 56-65 | 28.57% | 0.35 |
| 2 | 66-75 | 9.86% | (0.24) |
| 2 | 76+ | 1.25% | (0.83) |
| 3 | 18-25 | 0.28% | (0.92) |
| 3 | 26-35 | 2.89% | (0.76) |
| 3 | 36-45 | 8.44% | (0.55) |
| 3 | 46-55 | 18.23% | (0.23) |
| 3 | 56-65 | 29.06% | 0.37 |
| 3 | 66-75 | 24.67% | 0.91 |
| 3 | 76+ | 16.43% | 1.23 |

*FIG. 17*

METHOD AND SYSTEM FOR AUTOMATICALLY DETERMINING DEMOGRAPHICS OF MEDIA ASSETS FOR TARGETING ADVERTISEMENTS

CROSS-REFERENCE TO RELATED APPLICATIONS

This application is a continuation of pending U.S. application Ser. No. 14/844,267, filed on Sep. 3, 2015, which is a continuation of U.S. application Ser. No. 14/336,384, filed on Jul. 21, 2014 (now, U.S. Pat. No. 9,161,099, issued on Oct. 13, 2015), which is a continuation of U.S. application Ser. No. 13/209,353, filed on Aug. 12, 2011 (now, U.S. Pat. No. 8,789,092, issued on Jul. 22, 2015), which claims the benefit of U.S. Provisional Application No. 61/372,974, filed on Aug. 12, 2010, and U.S. Provisional Application No. 61/378,299, filed on Aug. 30, 2010, all of which are hereby incorporated by reference in their entirety.

BACKGROUND

Brief definitions of several terms used herein follow, which may be helpful to certain readers. Such definitions, although brief, will help those skilled in the relevant art to more fully appreciate aspects of the invention based on the detailed description provided herein. Such definitions are further defined by the description of the invention as a whole and not simply by such definitions.

| | |
|---|---|
| Asset instance | A specific impression, airing, or advertising event. For example, a media asset may be CNN-Monday through Friday. An Asset instance of this asset may be CNN-Tuesday-8:05pm-AC360. |
| Media asset | Advertising media that can be published for purposes of advertising. Examples include television airing, radio spot, newspaper spot, internet publisher page. For example, a television media asset may comprise some combination of station-geography-program-day-hours such as WXGN-Florida-SixO'ClockNews-Monday-6pm, or may be a more general set such as FOX-Monday through Friday. |
| Asset | Same as media asset |
| Media | Same as media asset |
| Station | Same as media asset |
| Station-Program | Same as media asset |
| Station-Program-Day-Hour | Same as media asset |
| Product | Something that is being sold by an advertiser. The product and advertisement are used interchangeably - each product is assumed to have one or more advertisements that can be aired on television media. The contents of the advertisement are considered part of the product for the present system in order to simplify the description. |
| Advertisement | Same as Product |

A variety of methods have been used in the past for television advertising targeting.

Television Ad Targeting Using Intuition

The first method which is widely used today uses human intuition and insight to identify which television programs to purchase. This method can be effective, however, doesn't scale. There are over 2 million possible television advertising placements during a year even with conservative estimates of airing frequencies, and many more when local broadcast schedules are considered (there are 5,000 local stations), and so picking the right times, geographies, and programs to run is difficult.

Television Ad Targeting Using the Nielsen Television Panel

A second method for targeting television advertisements is to use Nielsen age-gender ratings. Nielsen's viewer panel was developed in the 1960s and consists of 5,000 to 25,000 households spread around the United States. The viewing panels themselves range from fully electronic recording systems to paper-based diaries.

Nielsen panelists track their viewing habits, and then Nielsen aggregates the data and shows the age-gender demographics for each program. A media buyer can then decide whether to purchase advertisement for this programming if it seems to be like the audience that would want to purchase the product.

Television Ad Targeting Using Historical Ad-Media Performance

Another form of television ad targeting uses historical data from previous advertisement airings on media, and their performance, in order to predict whether buying another airing with the same program-station-day-hour might be effective. This technique is most commonly used for "Television long-form buying", also known as "Infomercials". In order to determine if "DIY Saturday midnight-1 am" will perform well, the ad company looks for how the ad performed in this same time-slot and station a week prior (for example). The best example of this method that we know of besides our own work in this area is from Tellis et. al. (2005) which presents an automated system of this kind. The system includes lag-terms for ad placements, and responses collected over the past several hours. Tellis, G., Chandy, R., MacInnis, D., Thaivanich, P. (2005), "Modeling the Micro-effects of Television Advertising: Which Ad Works, When, Where, for How Long, and Why?", Marketing Science, Marketing Science 24(3), pp. 351-366, INFORMS.

Television Ad Targeting Using One-to-One Techniques

Television Ad Targeting should theoretically be able to be performed by analyzing an individual television viewer's activity to determine what products they're interested in, and delivering an advertisement to that specific person.

At the moment this technology is not available for television except in some very limited—generally research-related—cases. Most of the work in this area comprises experiments, tests in the New York area where some one-to-one capabilities have been installed via the cable system in that area, and academic studies. There are technological problems around both tracking viewer activity, as well as delivering an ad to them without delivering it to lots of other customers. The overwhelming majority of televisions as of 2011 have no capability for individualized tracking or ad delivery.

One-to-one television ad targeting was first discussed as early as the 1970s. Personalized television programming has since been proposed by Smyth and Cotter (2000) and Spangler et. al. (2003). Smyth, B. and Cotter, P. (2000), "A Personalized Television Listings Service", Communications of the ACM, Vol. 43, No. 8, August 2000, pp. 107-111; Spangler, W., Gal-Or, M., May, J. (2003), "Using data mining to profile TV viewers", Communications of the ACM archive, Volume 46, Issue 12 (December 2003), pp. 66-72. One-to-one targeting in a TV context has been described conceptually by (Arora, N., Hess, J., Joshi, Y., Neslin, S., Thomas, J. (2008), "Putting one-to-one marketing to work: Personalization, customization, and choice", Marketing Letters, Vol. 19, pp. 305-321.). Chorianopoulos, Lekakos, Spinellis (2003) and Lekakos and Giaglis (2004) ran experiments which tested the effectiveness of personalized advertising on television. Chorianopoulos, K. and G. Lekakos and D. Spinellis (2003). "The Virtual Channel Model for Personalized Television", Proceedings of the 1st EuroITV conference: From Viewers to Actors pp. 59-67. They recruited experimental subjects and had them fill out surveys to classify them into segments. They next used a training set of users who had explicitly indicated their interest in some advertisements to predict interest in the new ads.

BRIEF DESCRIPTION OF THE DRAWINGS

A brief description of the drawings follows.

FIG. 1.1 shows sample media plan data. This is the data that is produced by media buyers purchasing media to run in the future. This includes what station the commercial will run on, what advertiser, what creative, what the media cost associated with the purchased data is, what individual phone numbers and web address will be associated to the commercial for tracking purposes.

FIG. 1.2 is sample data that is generated by $3^{rd}$ party verification services. These services watermark commercials and then monitor when the media was run across all TV stations. This is analogous to a web pixel server in online advertising. The purpose of this data feed is to verify that the media that was purchased actually ran.

FIG. 1.3 is sample trafficking instructions/order confirmation sent to stations. This is confirmation of what was purchased and instructs the stations when to run which commercial creatives (advertiser's 30 second media asset). This can also tell the station to a/b test across multiple versions of a creative, etc.

FIG. 1.4 shows sample call center data. This data records the phone responses to phone numbers displayed in the commercial creatives. Essentially each phone number is unique to each commercial or station and time.

FIG. 1.5 shows sample e-commerce data. This data is for orders that came on an advertiser's website. This data shows the customer information and time the orders came in.

FIG. 1.6 shows the actual order data that is placed in the advertiser or retailers system. This data is final purchase record and is typically updated with subsequent purchases for subscriptions, bad debt collection problems, and returns.

FIG. 1.7 shows a sample of consumer data enrichment. Typically this is a wide array of hundreds of attributes about consumers from the various data bureaus. This includes demographics, psychographics, behavioral information (such as recent purchases), household information, etc.

FIG. 1.8 shows sample program guide data. This is the data of the programming that is going to be run in the future on individual stations in terms of time, program name, program type, stars, and general text description.

FIG. 1.9 shows sample audience panel data. This data is from a rollup of previous purchasers and their associated demographics, psychographics, etc from FIG. 1.7. Alternatively, this could also come from set top box data appended with the same sets of attributes or other existing viewer panels.

FIG. 1.10 is a flow diagram illustrating an example basic process of advertisement targeting.

FIG. 1.11 is a flow diagram illustrating an example enhanced process of advertisement targeting.

FIG. 1.12 shows a plot of orders per advertisement as a function of similarity.

FIG. 1.13 shows a box plot of orders per advertisement airing by quartile of similarity score.

FIG. 3 shows an example program finder result for media assets.

FIG. 8 shows an example screenshot of how customer records are input to the program finder.

FIG. 9 shows an example screenshot of a program finder profile builder.

FIG. 10 shows an example result of top rotations determined by the program finder.

FIG. 11 shows an example program finder result for program media asset patterns.

FIG. 16 shows lift scores for customer demographic attributes for product buyers for a magazine product.

FIG. 17 shows the distribution for age for a particular magazine product, including the lift distributions for the natural clusters that were automatically generated by the system.

DETAILED DESCRIPTION

Figure 2:
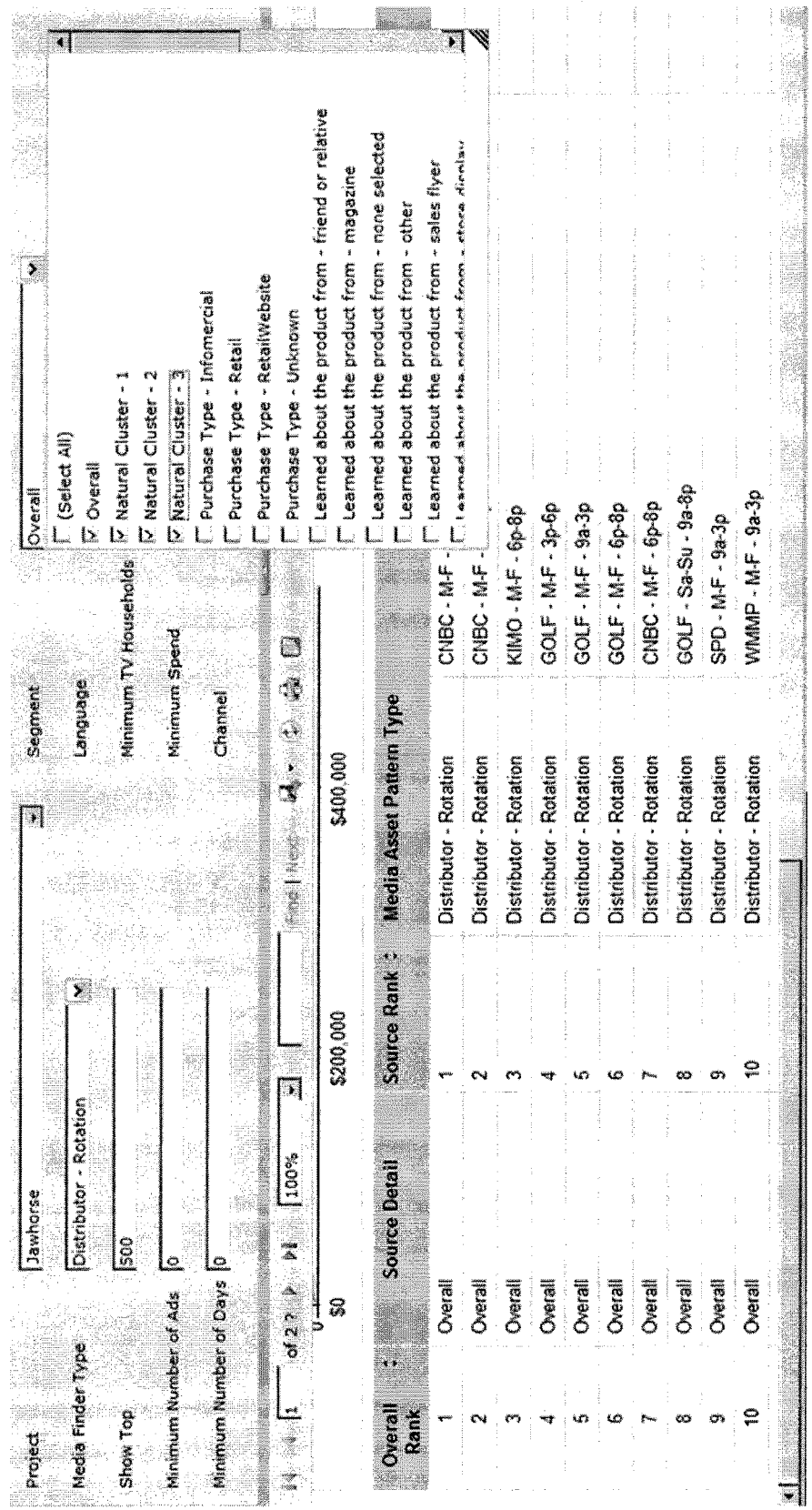
FIG. 2 shows an example screenshot of different segments that can be targeted.

Aspects of the inventive system, as described herein, recognize that the media is represented by the demographics of people who are watching. Using this insight, the system can create a "fingerprint" for the kinds of customer that buys a product of interest. The system can then perform a vector match against media looking for the closest match. After the system finds a close match, it recommends buying that media. Although the technology for one-to-one television advertisement targeting is not currently available, aspects of the current invention are designed to work with one-to-one targeting capabilities and can utilize one-to-one tracking and delivery when that becomes available. The present invention would simply add in the individualized information to its segment information in order to improve the ad match quality.

The method used by a media buyer using Nielsen aggregated data to determine which program to purchase is not based on any formal method (such as vector match), nor is it based on analysis of the product buyer population. Furthermore, while the Nielsen panel is a useful data source and use of this data is described in this application, the Nielsen viewer panel is inherently limited by its very small size, minimal ability to cover different geographic areas, and this has remained a consistent problem with using Nielsen data for deciding whether to purchase ads for a particular programming. A variety of enhancements are discussed for making the techniques described below compatible with multiple other demographic sources (including census, Set top box data, and linked buyer data) so as to create a highly complete and rich profile based on millions of viewers, over 400 variables, not just 2 or 20 as are available through the Nielsen panel, and buyers rather than viewers.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

System Architecture

Prior to being able to do response modeling and detailed targeting for television media, a large amount of system infrastructure should be in place. The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Step 1: Setup Data Feeds with Media Agency

A first step is to ensure all the data about what media is being purchased, running, and trafficked to stations is collected to ensure that there is an accurate representation of the television media. This includes setting up data feeds for:

a. Media Plan Data (FIG. 1.1)
    b. Media Verification Data (FIG. 1.2)
    c. Trafficking/Distribution Data (FIG. 1.3)

Step 2: Setup Data Feed with Call Center

A second step is to ensure there is accurate data about the callers that called into specific phone numbers from the call center and it is important to get the call center onboarded with a data feed (FIG. 1.4).

Step 3: Setup Data Ecommerce Vendor Datafeeds

A third step is to setup recurring data feeds with the vendor or internal system of the advertiser that records orders that come in from the advertiser's website (FIG. 1.5)

Step 4: Step Data Order Processing/Fullfillment Data Feed

A fourth step is to setup recurring data feeds with the order vendor or internal system that physically handles the logistics of billing and/or fulfillment. This is important for subsequent purchases such as subscriptions and for returns/bad debt, etc to accurately account for revenue. This may also come from a series of retail Point of Sale system (FIG. 1.6).

Step 5: Setup Audience Data Enrichment Data Feed with Data Bureau

A fifth step is to ensure that every caller, web-converter, and ultimate purchaser has their data attributes appended to their record in terms of demographics, psychographics, behavior, etc (FIG. 1.7). Examples of Data Bureaus are Experian, Acxiom, Claritas, etc.

Step 6: Setup Data Feed with Guide Service

A sixth step is to ensure that the forward looking guide service data is ingested into the system. This is the programming of what is going to run on television for the weeks ahead (FIG. 1.8). This upcoming media will be scored by the current invention to determine which of this media should be purchased.

Step 7: Setup Data Feed for Panel Data Enrichment

Either through the purchasers of products on television, set top box viewer records, or existing panels it is necessary to get a feed of viewer/responder data that has the same demographic, psychographic, behavioral data appended to that is being appended to the advertiser's purchaser data in Step 5 (FIG. 1.9).

Step 8: Ingest all Data into Staging System

In step 8, all of the underlying data is put into production and all of the data feeds setup from Steps 1-7 are loaded into an intermediate format for cleansing, adding identifiers, etc. Personally Identifiable Information (PII) is also split and routed to a separate pipeline for secure storage.

Step 9: Run Business Logic/Models for Matching Responses and Orders to Media

In step 9, all of the data from the data feeds has been ingested into the system at the most granular form. Here the phone responses are matched up to the media that generated it. The e-commerce orders are matched using statistical models to the media that likely generated them.

Step 10: Load Data into Final Databases

In step 10, the data is aggregated and final validation of the results is automatically completed. After this, the data is loaded into the databases for use with any of the upstream media systems. These include the ability to support media planning through purchase suggestions, revenue predictions, pricing suggestions, performance results, etc.

Step 11: Use Data in Presentation Layer

In step 11, all of the data becomes accessible to the operators of various roles in the media lifecycle. This includes graphical tools for media planning (where the targeting in this application primarily fits), optimization, billing, trafficking, reporting, etc.

System Inputs and Outputs

The user provides the following information:

A1 Inputs

1. Customer name and address, telephone number, cookie, or some other record identifying customers

OR 2. a manual specification for one or more demographic profiles that the user would like to target B1. Outputs 1. List of Media Assets and their corresponding Fitness scores A2. Optional Inputs The user may also provide other information, although this is not necessary for the invention to perform ad targeting:

3. One or more Segments for each customer record, to which this customer belongs (optional)

4. Keywords related to the product (optional)

5. Maximum Cost or Budget: The amount of money that the user would like to spend (optional)

6. Minimum ROI: The ratio of revenue/cost that the user would like to maintain. Technically this is a constraint in which media will be purchased subject to being greater than this value, but it is often colloquially referred to as a "goal" or "objective" (optional)

7. Minimum relevance: A score such as a tratio or correlation coefficient (described later) indicating how well the television programming matches the product demographics. The system may identify cheap media to purchase, but the user may want to maintain a minimum standard for relevance when performing ad targeting.

8. Notification guidelines: Specifications for how the system should contact the user to either seek review and confirmation of purchasing the media assets, or whether the system has the user's authority to purchase the media without further notification ("auto-pilot" version).

B2. Optional Outputs

2. Purchase instructions for Media Assets: The system will identify media assets to purchase and then proceed to create a "buy order" for this media.

Details of the Ad-Program Targeting Algorithm

The steps of the ad-program targeting algorithm are given below. These steps are shown in a flow chart in FIGS. 1.10 and 1.11.

1. Create a product profile
2. Create a media profile
3. Calculate the demographic similarity between product and media profiles
4. Use product-media demographic similarity as one of the factors when buying television media
5. Add historical media performance information
6. Add contextual match information between product and station
7. Compute final prediction of media-product fitness based on any of the above factors Step 1: Create Product Profile The first step is to identify which kinds of customers would like to buy the product. In many cases, an advertiser already has a significant number of customers who have bought the product previously. These customers are known because they have had to provide their credit card number, name, address, and phone number as part of the order process.

The system can take this database of customers, and enrich the customer records with demographics. For example, using the zip-code of the customer it is possible to infer their household value using US Census data. Using name it is often possible to infer gender and ethnicity (e.g. "Christine"→Female, "Bob"→Male). A variety of third party services for customer demographics exist, and can be used for this purpose, for example, Acxiom, which maintains an extensive database, and enriches to over 400 variables including income, age, gender, interests, and so on.

After enriching the customer records, the system can now create an average profile for customers who have bought this product.

Customer demographics can be defined as $r_{i,D_j,k}$ where $D_j$ is the jth demographic variable for customer response i and product k. The product profile $p_{j,k}$ will be defined as the average of the many customer demographics where that demographic is not a missing value, and the customer in question purchased product P(i,k).

$$p_{j,k} = \frac{1}{I} \sum_{i: P(i,k)} r_{i,D_j,k}$$

After creating the product profile, the system can report on the most distinctive attributes of the product profile. Assume that there are a large number of customers with demographic enrichment, from a variety of products k. The system can calculate a grand mean or population centroid as follows:

$$p = \frac{1}{IK} \sum_k \sum_i r_{i,D_j,k}$$

$$\sigma = \sqrt{\frac{1}{IK} \sum_{i,k} (r_{i,D_j,k} - p_{j,k})^2}$$

Each product profile element can be expressed as a z-score compared to the population mean and standard deviation:

$$z_{j,k} = \frac{(p_{j,k} - p)}{\sigma}$$

The operation above ensures that each profile value is re-scaled so that its difference from the mean is scaled to units of standard deviations. Therefore, all of the dimensions are now transformed into the same z-score scale. Higher zscores means more unusually high variable compared to the population. While a z-score is used in the calculations here, any standardized or normalized statistical score can be calculated for each variable and used in a similar manner.

Table I shows a product profile for a handyman tool product that indicates that customers enjoy woodworking and auto-repair. They buy unusual amounts of "big and tall male apparel", smoke at a higher rate than the population, and engage in outdoor activities and even like fishing.

Table II shows a product profile for a cat product. The highest z-score is "cat owner". The buyers are also older, are interested in environmental issues, and give to charities.

Figure 12:
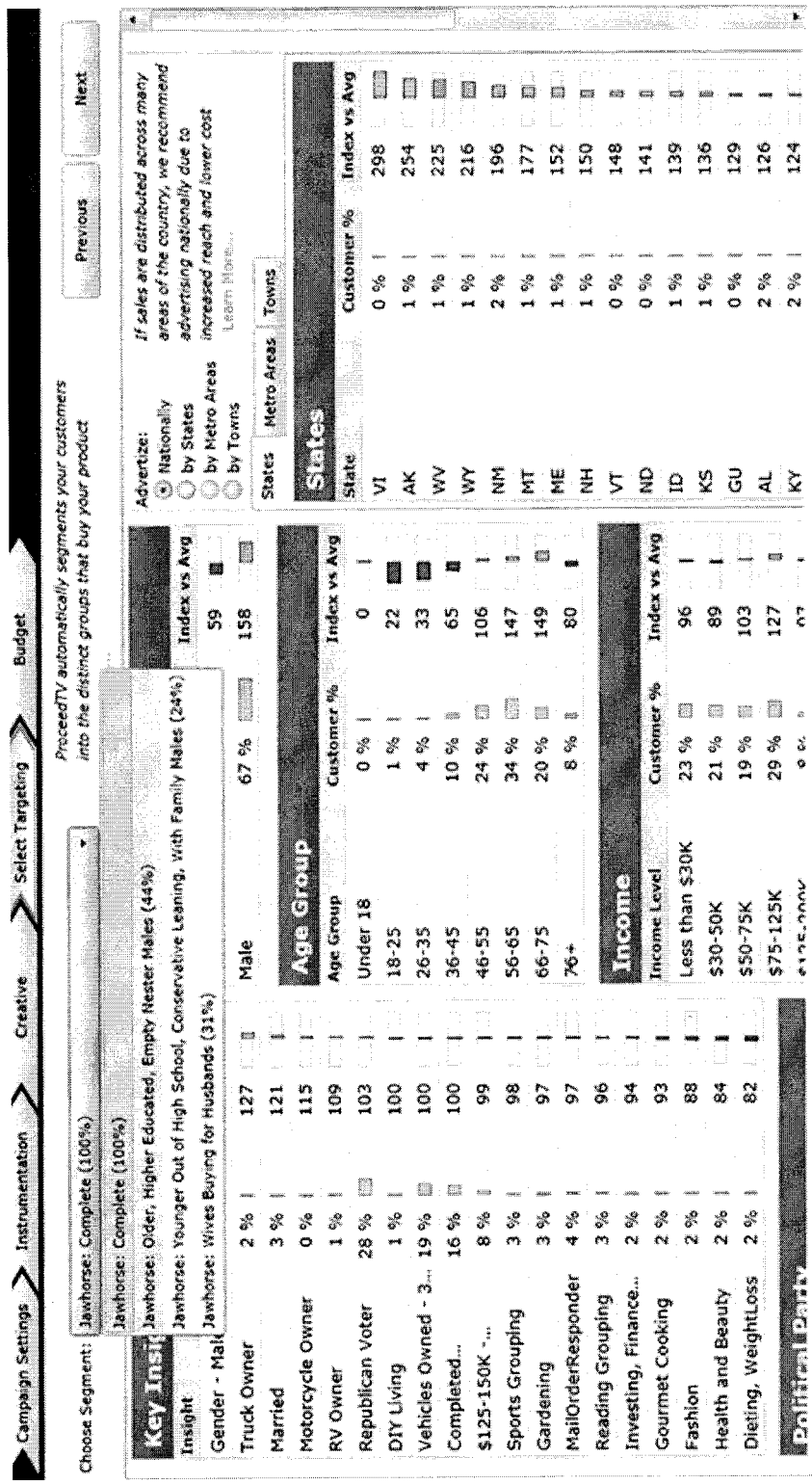
FIG. 12 shows an example screenshot of a program finder result for targeting television media.
Figure 13:
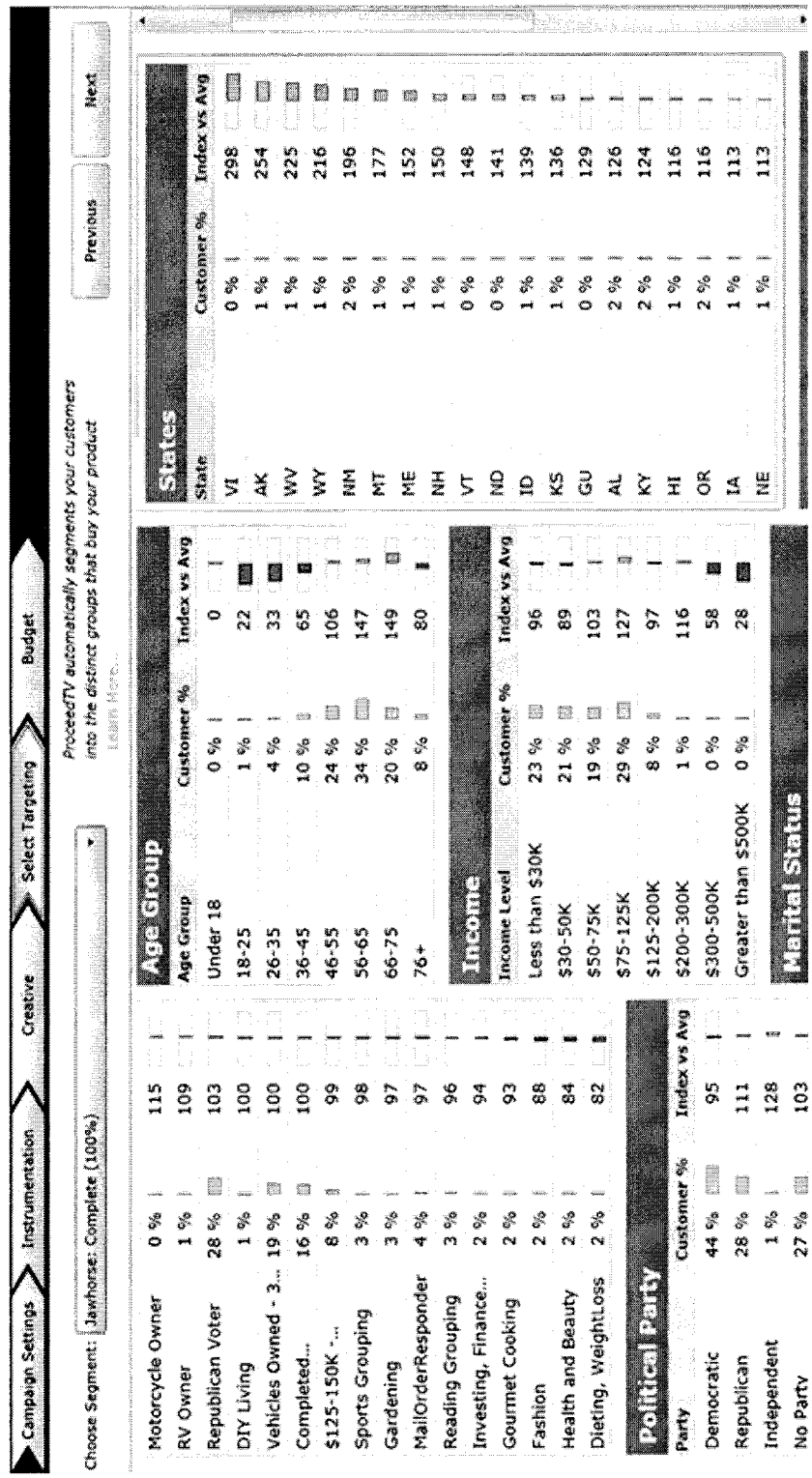
FIG. 13 shows an example screenshot of a program finder result for targeting television media.
Figure 14:
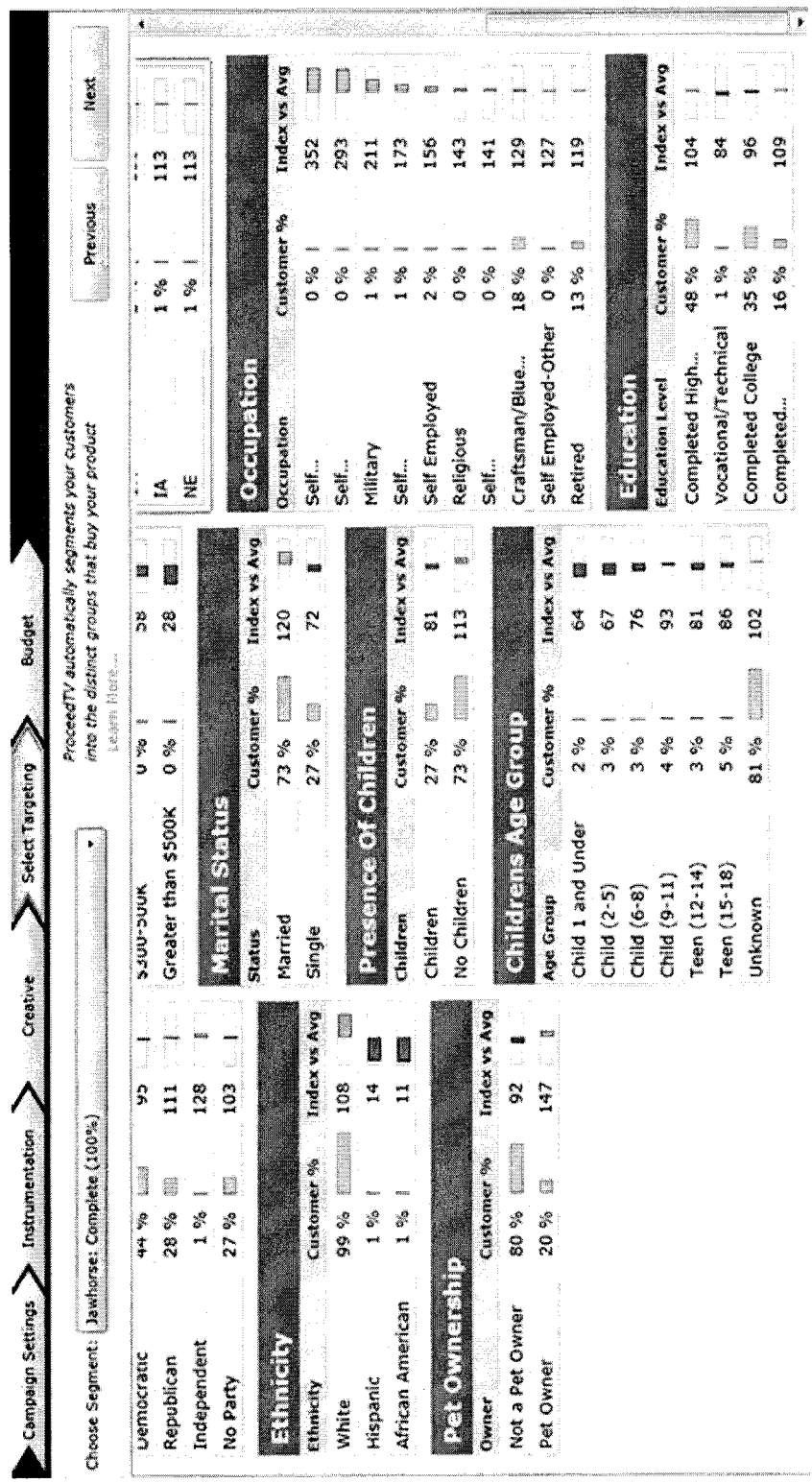
FIG. 14 shows an example screenshot of a program finder result for targeting television media.

FIGS. 12-14 show some screenshots of the product profile for the handyman product. The colored bars either show that the demographic variable-value is higher than a reference population (green, extend rightwards) or lower than normal (red, extend leftwards). In this case, these graphs show that buyers of a handyman product are often male, republican, have an age range between 45-75, incomes ranging from 75K-125K and so on.

One other embodiment is to display the product profile information in a manner called "key insights". The Key insights section (the left hand column in FIG. 12) shows the variable-values that are unusually high compared to the reference population (more on reference populations later). In order to improve the presentation of this information, the variable-value with the highest observed-percent/reference population-percent should be displayed, but for each variable, only the maximum variable-value should be shown— the remainder should be suppressed to improve readability. For example, a particular profile might have "Income= 125K . . . 150K"=+50% and "Income=100K . . . 124K"=+ 25%, and these may be the highest variable-values. The first variable-value should be shown, and the second should be suppressed since the maximum from the variable has already been selected. This has the effect of picking the most distinctive variable-values from each variable category, which aids in readability since it is easier to see the different variables that are distinctive for the customers.

Figure 15:
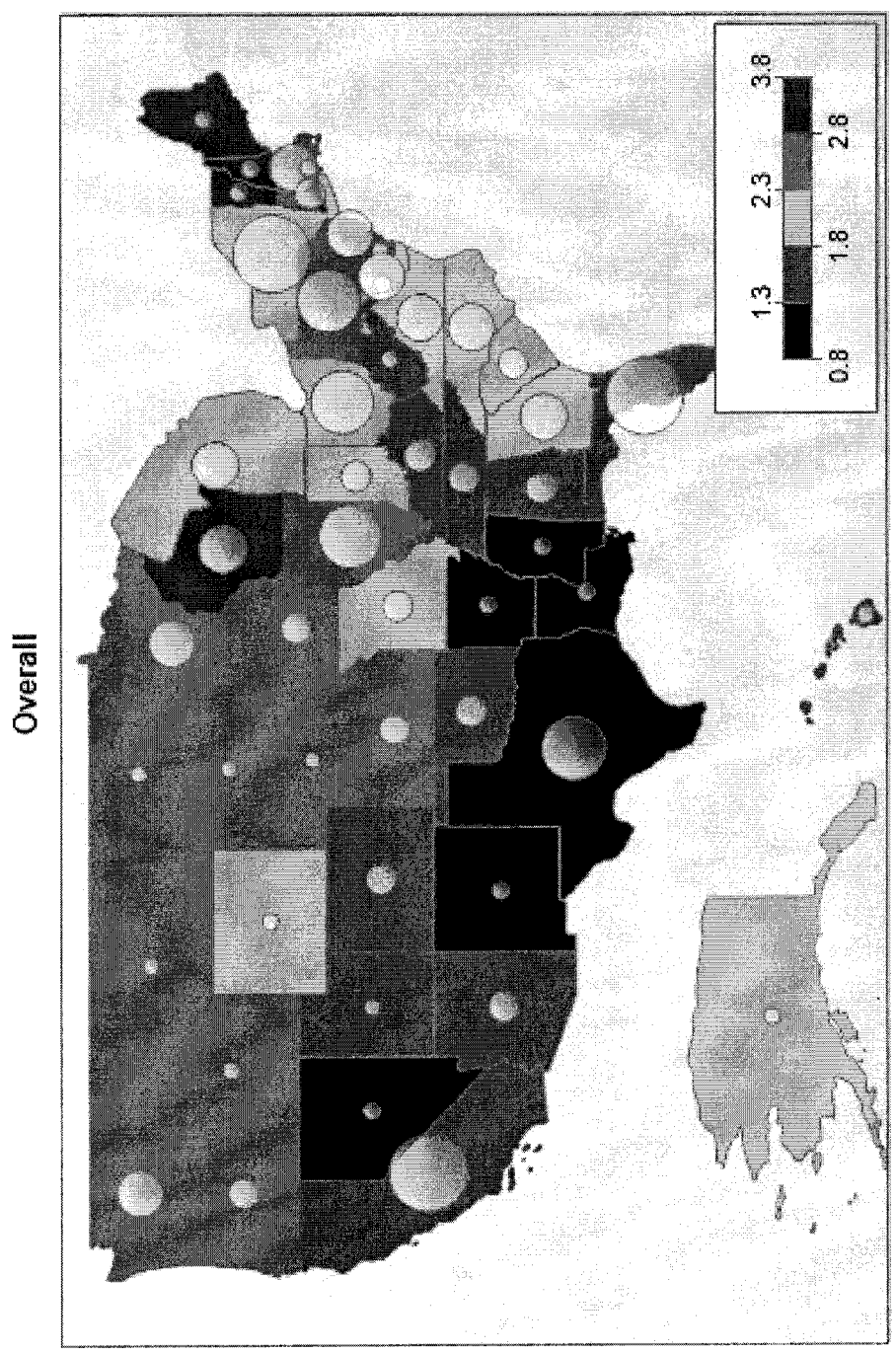
FIG. 15 shows a geographic distribution of product buyers.

FIG. 15 shows a geographic distribution of product buyers. Green represents more buyers per capita. The per capita counts, along with census-based demographic match correlation, each provide for additional media asset patterns that are used when calculating the fitness score for any potentially buyable media asset.

FIG. 16 shows lift scores for customer demographic attributes for product buyers for a magazine product. These lift scores are generated automatically, and using "key insights" the most distinctive demographics are provided in a summary view.

FIG. 17 shows the distribution for age for a particular magazine product, including the lift distributions for the natural clusters that were automatically generated by the system. The system generates these clusters and lift-scores automatically and provides them to the user.

Such insights into the buyer population could be used to optimize the advertising program. For example, because the cat buyers are interested in environmental issues, the advertising creative could be modified to mention that the cat product is bio-degradable. Since the buyers like to give to charities, the advertiser might offer to donate 5% of proceeds to a charity such as an animal shelter.

A. Product Clusters and Segments for Ad Targeting (Optional)

The above steps create a single product centroid. It is also possible to create multiple clusters for use in ad targeting. One embodiment is to do this using unsupervised clustering such as K-Means algorithm.

Another embodiment is to utilize segments that have been pre-defined by the client, and then create a profile for each of those pre-defined segments. Examples of segments can include, but are not limited to, recently acquired customers, such as within the last three months, the top 10% of customers based upon dollar amount purchased, and the bottom 10% of customers based upon dollar amount purchased.

TABLE I

DEMOGRAPHIC PRODUCT PROFILE FOR PROJECT 10023 (HANDYMAN PRODUCT).

| Variable | z-score |
| --- | --- |
| Woodworking | 0.588898 |
| AutoWork | 0.491806 |
| Automotive, AutoPartsandAccessories- | 0.48754 |
| SportsandLeisure-SC | 0.470068 |
| HomeImprovement-Do-It-Yourselfers | 0.447953 |
| Gardening | 0.438412 |
| Camping/Hiking | 0.43656 |
| Gardening-C | 0.429214 |
| HomeImprovement | 0.421209 |
| HomeandGarden | 0.417073 |
| SportsGrouping | 0.407583 |
| HomeImprovementGrouping | 0.39556 |
| AgeinTwo-YearIncrements- | 0.392807 |
| DIYLiving | 0.392767 |
| Computers | 0.387011 |
| PCOwnerID | 0.386974 |
| OutdoorsGrouping | 0.385564 |
| TruckOwner | 0.369703 |
| CreditCardHolder-UnknownType | 0.369275 |
| BankCardHolder | 0.36921 |
| HomeFurnishings/Decorating | 0.365209 |
| Apparel-Men's-C | 0.362816 |
| Income-EstimatedHouseholdID | 0.360737 |
| Crafts | 0.357646 |
| Income-EstimatedHousehold- | 0.349372 |
| AgeinTwo-YearIncrements- | 0.342792 |
| Fishing | 0.342675 |

TABLE II

DEMOGRAPHIC PRODUCT PROFILE FOR PROJECT 10019 (CAT PRODUCT).

| Variable | z-score |
| --- | --- |
| CatOwner | 0.72978 |
| OtherPetOwner | 0.507782 |
| AgeinTwo-YearIncrements-InputIndividualID | 0.497612 |
| AgeinTwo-YearIncrements-1stIndividualID | 0.470661 |
| Pets-SC | 0.460489 |
| Community/Charities | 0.382429 |
| CollectiblesandAntiquesGrouping | 0.382163 |
| Value-PricedGeneralMerchandise-SC | 0.380277 |
| Collectibles-General | 0.378843 |
| Gardening | 0.362677 |
| EnvironmentalIssues | 0.356035 |
| Gardening-C | 0.339698 |
| HomeImprovementGrouping | 0.339207 |
| HomeLiving | 0.334977 |
| SportsGrouping | 0.328068 |
| Cooking/FoodGrouping | 0.325231 |
| Movie/MusicGrouping | 0.32243 |
| HomeFurnishings/Decorating | 0.322362 |

Step 1.2 Alternative Method for Defining the Product Profile

An alternative method for defining the product profile is to ask a user to "manually define" the profile that they would want to target. For example, they could specify that they would like to target:

1. Persons who have an interest in fishing +50%
2. Persons who have more than 4 cars −100%
3. Persons who have more than 4 children +100%

4. Persons who have diabetes interest +50%
5. And so on

In one embodiment, the user specifies these variables by defining the percentage above or below the "reference population" for this demographic. In the above example, the user specified interest in identifying media for people who are 50% higher than the population in terms of interest in diabetes.

Based on the above "manually defined" profile, these lift scores can now be translated back into product z-scores by setting: z=((diff+1)*mean)/stdev. The remainder of the matches to media then performs the same as described in the following sections.

Step 2: Create Media Profile

The next step is to create a demographic profile of television media assets. If the television media has customer viewership information it may already have demographics associated with it. In this case the "linkage" between the person and the media is a definite viewing event by that person.

In another embodiment, television media that is linked to buyers by way of a unique phone number or other device to tie the media to the person can be used. Linking keys can be any of a (a) telephone number, (b) URL, (c) offer, (d) cookie, or some other identifier in the advertisement that is uniquely associated with an advertisement on the media. When the customer uses the key to buy the product, that customer can be tied back to the unique broadcast where they saw the embedded linking key.

The system can create an average profile for customers that have been linked to each media. For every media $S_i$ $S_{i,Dj}$ is defined as the jth demographic of the media $S_i$. Each media $S_i$ is equal to the sum of its constituent asset instances and the customers who were linked to those spots. Thus each media demographic profile is an average of the customer demographic vector who purchased from asset instances linked to the media. In one embodiment, the media demographic profile can be used to predict the demographic viewership of media assets.

An example of this kind of media demographic profile is shown in Table III. "Do It Yourself" ("DIY") station watchers have interest in Woodworking, Hunting, Gardening, Sport and Leisure, tend to be male (Big and Tall Male apparel). They also own dogs and smoke at a higher rate than the rest of the population. Please note the significant similarity between DIY profile and that of the handyman tool product. This will be uses in the next step.

Table IV shows a television station profile for "Animal Planet". The television audience for this station tends to be older, female, owns pets, and so on. There are a variety of traits also in common with the cat product.

TABLE III

DEMOGRAPHIC PRODUCT BUYER PROFILE FOR DO IT YOURSELF CHANNEL

| Variable | z-score |
|---|---|
| Gender-InputIndividualID | −3.45 |
| Reading-FinancialNewsletterSubscribers | 3.21 |
| Apparel-Men's-BigandTall-C | 2.38 |
| Donation/Contribution-C | 1.97 |
| DogOwner | 1.62 |
| SeniorAdultinHouseholdID | 1.61 |
| Woodworking | 1.57 |
| Collectibles-Antiques | 1.54 |
| Hunting/Shooting | 1.52 |

TABLE III-continued

DEMOGRAPHIC PRODUCT BUYER PROFILE FOR DO IT YOURSELF CHANNEL

| Variable | z-score |
|---|---|
| Gardening-C | 1.49 |
| Golf | 1.38 |
| SportsandLeisure-SC | 1.32 |
| OutdoorsGrouping | 1.29 |
| Arts | 1.19 |
| Smoking/Tobacco | 1.18 |

TABLE IV

DEMOGRAHIC PRODUCT PROFILE FOR ANIMAL PLANET TV CHANNEL

| Variable | z-score |
|---|---|
| Gender- | −3.08 |
| Pets-SC | 2.55 |
| CatOwner | 2.35 |
| Veteran | 2.30 |
| Donation/Contribution- | 2.25 |
| Gardening-C | 2.23 |
| Collectibles-Antiques | 2.22 |
| OtherPetOwner | 2.15 |
| Woodworking | 2.14 |
| Apparel-Children's-C | 2.13 |
| History/Military | 2.09 |
| Apparel-Women's-C | 1.89 |
| PCOperatingSystemID | 1.83 |
| EnvironmentalIssues | 1.81 |

In one embodiment, the media demographic profile can be reported as an index showing the proportion of demographics on each media asset. For example, the average income level of viewers of a particular television station is 50 percent above the average income level in the United States, and this can be indicated using an index.

In another embodiment, the media demographic profile can be reported as the population equivalent numbers of viewers on each media asset. For example, the number of viewers of a particular television station that is male and between the ages of 30 and 32 can be given as a percentage of the general population.

A. Calculate Media Profile Using Viewer Panel

An alternative method for calculating the media profile is to use a viewing panel demographics, and to summarize the profile based on the viewing panel. In one embodiment the viewing panel may make available their demographics, and may make available the media that they are watching throughout the day. As a result, it is now possible to summarize the media profile as the average of demographics of the panel viewers (an example is the Nielsen panel which maintains 5,000-25,000 customers and some demographics).

In another embodiment, the media profile is calculated using information obtained from unique set-top boxes that have been assigned television viewers to record the television viewing history of the viewers and using demographic information provided by the viewers (an example is Set top box data provided by a company such as Tivo and which has demographics appended via a company such as Acxiom).

As will be appreciated by those skilled in the art, there may be other techniques to monitor viewers' television viewing history and obtain demographic information from those viewers. A media profile can be calculated using these other techniques.

Step 4: Calculate Product-Television Station Similarity (Using Linked Buyer Records)

The disparity δ between the product and television station program can be calculated as below.

$$\delta(p_{i,D_j}, S_{iD_j}) = |p_{i,D_j} - S_{iD_j}|$$

A. Basic Normalization for Calculation of Similarity

In measuring the disparity between spot and customer response demographics, it is necessary to appropriately scale the variables to maximize the effectiveness of the match. Demographic variables range from ordinal values in the tens (e.g. age ranges from 18 . . . 80) to "has children" which is a two-value binary variable, 0, 1. If the variables aren't scaled then in an L1-distance calculation, the age variable would tend to exert up around 50× more "weight" on the distance match than gender. Yet gender may be just as valuable as age. Because of this, the system standardizes each disparity to z-scores. The transformation is $$\Delta(p_m, S_k) = \frac{\sum_j w_j Z(p_{m,D_j}, S_{kD_j})}{\sum_j w_j}$$

$$Z(p_{m,D_j}, S_{k,D_j}) = \frac{\delta(p_{i,D_j}, S_{k,D_j}) - \frac{1}{j}\sum_{i,k}(p_{i,D_j}, S_{k,D_j})}{\sqrt{\frac{1}{j}\sum_{i,k}\left[\delta(p_{i,D_j}, S_{k,D_j}) - \frac{1}{j}\sum_{i,k}\delta(p_{i,D_j}, S_{k,D_j})\right]^2}}$$

Z is the standardized discrepancy for demographic j. wj is a weight on demographic j which can be computed numerically by regression, or entered by a user to place more or less weight on the match between different demographics. D is the overall average weighted discrepancy between the demographics of product and media.

Each demographic is compared against the distribution of its disparities to determine whether it is high or low compared to the norm for disparity.

As a result, the system provides a similarity score, with the lower value indicating better similarity between the product and station demographics.

Table V shows the top list of stations that match the handyman product. ESPN, HGTV, DIY, HISTORY channel, Hallmark, which are all very similar stations.

TABLE V

Closest Television Stations For Project 10023 (HandyMan Tool Product)

| Project key | Station natural key | Similarity |
|---|---|---|
| 10023 | KL4 | −0.305 |
| 10023 | ESPNU | −0.302 |
| 10023 | HGTV | −0.300 |
| 10023 | DIY | −0.297 |
| 10023 | DG8 | −0.296 |
| 10023 | DISH_Network | −0.294 |
| 10023 | HALL | −0.293 |
| 10023 | HIST | −0.292 |
| 10023 | ESPN2_Local | −0.291 |
| 10023 | CRT5 | −0.288 |

B. Alternative Methods for Normalizing the Media Profile

In order to help reduce bias, the invention allows for the definition of different panels of persons as "reference populations" to create z-score parameters. For example, if customers were acquired through the web, then the appropriate means and standard deviations for these customers would be based on a large population of web users (typically web users are younger, higher income, etc). The product vector is then summarized using z-scores relative to the mean and standard deviation of the reference population. Similarly, customers acquired through television phone response should be compared to a large set of television phone responders; in general, these responders tend to be older. By comparing the customers to the appropriate reference population, the influence of the acquisition vehicle can be reduced.

The invention allows multiple "reference populations" to be maintained, and used for comparison—one particular embodiment includes an ecommerce panel (customers who are active on the web), DRTV panel (persons who have telephoned in response to a television ad), and 1% of US population panel (persons who are sampled to approximately 1% of US population).

Mapping Between Different Demographic Sources

In the above discussion, both customers who are linked to media, as well as product buying customers, are each enriched with the same set of demographics (eg. both might have Acxiom data enrichment). However, in some instances, product customer demographics and media asset demographics will originate from different sources. For example, customer records associated with linked buyers can be enriched with data obtained from a third party that provides consumer demographics, e.g. Acxiom, while media asset viewer demographics can be obtained from a viewing data provider, e.g., Tivo. With different demographics sources, a transform or demographic conversion can be used to convert the customer demographics into comparable media asset demographics, or vice versa.

In one embodiment this is implemented by creating (a) an aggregation layer which maps multiple source demographics and numerically transforms and then aggregates them based on parameters that that are set (eg. transform could just be a sum), and (b) a mapping table which maps the newly created aggregated variable from source 1 demographic to source 2 demographic (so that the appropriate "income>$120K" in source 1 maps to an appropriate "income>$120K" variable in source 2).

For example, in source 1 there may be the categories "age 18", "age 19", "age 20", and these are aggregated to "age 18-20" using the mapping layer, and then mapped to an equivalent "age 18-20" variable that exists in the second demographic source. Using this method, profile vectors can be created using the aggregated/transformed demographic representation, and mapped one-to-one to media vectors in a second source that have also been transformed in this way.

Tables showing example mapping of variables from one demographic to another are shown in Table VI and Table VII. Table VI shows examples of demographic mapping from some Acxiom variables to some US Census variables (over 20 variables can be matched). The mapping between Acxiom variables to US Census variables is used to match product vector with 400 elements enriched by Acxiom data to US Census data.

Table VII shows an example mapping of some Acxiom variables to some Nielsen variables (about 10 variables match). The mapping between Acxiom variables to Nielsen variables is used to match Acxiom-enriched product demographic vector against Nielsen Media assets that have a limited number of variables available.

Using this mapping technique, match scores between products and Geographic areas including Direct Marketing Association areas, Television Cable Zones, Zip codes, States, and "Advertising Patches" (a unit that Lowes stores use) and other Geographic areas) can be calculated, allowing upcoming television airings in local areas to be targeted in part based on customer characteristics in their geographic area.

Also using this technique, match scores between the product and the Nielsen panel can be created, allowing the TV media that the Nielsen panelists watched to be appropriately scored, as another source of information about the media. The same technique can also be used for Set Top Box data such as that provided by Tivo—in this case, income, ethnicity, age, gender, and other variables can be mapped in the same way, allowing match scores to be created against Tivo-provided Media. These match scores can subsequently be combined to create an overall score for value of targeting some media asset in question.

Getting a Combined Media Asset Score from Multiple Media Asset Patterns

There's one further step that is required in order to produce a practical estimate of similarity. Each media asset itself is comprised of several different "features" which carries information about the ultimate performance of the particular media instance that is under consideration. For example, let's say that on the upcoming schedule, there is the program "AC360" on CNN next Monday at 7 pm, for a television viewer located in Seattle. Predicting the performance of this instance should be possible using information about the performance of: the station "CNN"; eg. higher income people tend to watch; the program "AC360"; television on "Mondays at 7 pm on any station"; eg. fewer old people percentage-wize watch during this time; television on

TABLE VI

Examples of Demographic Mapping Between Some Acxiom Variables and Some US Census Variables

| Aggregator | Census | Acxiom Demographics Name | Acxiom Demographics Value |
|---|---|---|---|
| Age20to21 | TotalPopFemale20 | AgeinTwo-YearIncrements-InputIndividualDetail | Age 20-21 |
| Age20to21 | TotalPopFemale21 | AgeinTwo-YearIncrements-InputIndividualDetail | Age 20-21 |
| Age20to21 | TotalPopMale20 | AgeinTwo-YearIncrements-InputIndividualDetail | Age 20-21 |
| Age20to21 | TotalPopMale21 | AgeinTwo-YearIncrements-InputIndividualDetail | Age 20-21 |
| Age22to24 | TotalPopFemale22to24 | AgeinTwo-YearIncrements-InputIndividualDetail | Age 22-23 |
| Age22to24 | TotalPopMale22to24 | AgeinTwo-YearIncrements-InputIndividualDetail | Age 22-23 |
| Age22to24 | TotalPopFemale22to24 | AgeinTwo-YearIncrements-InputIndividualDetail | Age 24-25 |
| Age22to24 | TotalPopMale22to24 | AgeinTwo-YearIncrements-InputIndividualDetail | Age 24-25 |

TABLE VII

Example Demographic Mapping Between Some Acxiom Variables and Some Nielsen Variables

| Enriched-Nielsen MappingID | Enriched-Demographics Variable | NielsenDemographics Variable | Demographics Variable |
|---|---|---|---|
| 1 | africanamerican | Black18-65 | African American |
| 2 | male | MaleAdult | Adult Male |
| 3 | female | FemaleAdult | Adult Female |
| 4 | workingwoman | WorkingWomanAdult | Working Woman |
| 5 | child6to8 | C6-8 | Child 6-8 |
| 6 | child9to11 | C9-11 | Child 9-11 |

Generating Media Assets from the Guide Service

In the discussion above, the product vector was matched to the media asset vector. More details about the media asset will now be described. Media may be purchased in several forms—for example, a specific Television program such as "AC360", a Rotator such as "CNN M-F 6 p-9 pm" or a broad station such as "CNN", and Geographic-specific versions of the same such as "CNN Seattle".

Using the upcoming media schedule, each of these "purchasable media grains" are applied to the schedule, and all feasible "purchasable media" are extracted and scored. These "purchasable media" are the media assets that are referred to throughout this disclosure.

"CNN on Mondays at 7 pm"; television on "CNN Monday 7 pm in Seattle"; the geographic area of "Seattle"; younger demographic exists in this area; the Rotation "CNN M-F 6 p-9 p"; the rotation "CNN 6 p-9 p"; and so on. Each of these features may convey information about the asset, as a "media asset pattern". Examples of media asset patterns include distributor (station), program, genre, distributor-rotation, day of week-hour of day, day of week, hour of day, media market, state, state per capita, Direct Marketing Association customers per capita, Cable zone, and Cable zone customers per capita.

For each media asset, a similarity match is computed between the M media asset patterns that comprise the media asset, and the product. There are M similarity scores. The invention combines this evidence to create an overall score for the fitness of the upcoming airing. An example embodiment is as follows:

$d(p,s) = sum\ i(w(i)*d(p,\text{mediaassetpattern}(s,i)))$ where $i\ e\ [1 \ldots M]$ An example of combining media asset patterns is provided below for the case of trying to estimate the similarity of a rotator to the product. As discussed, a rotator comprises a wide variety of programming, times, and days, and as a result, the final estimate for similarity needs to blend all of these constituent components. For example, consider CNN "M-F 6 p-9 p". Three programs each night might be covered by this rotator. The vector match is calculated based on all of the persons in that period and their demographics. Next, the similarity of "Program 1", "Program 2", "Program 3", "CNN", "CNN M-F", and other media asset patterns, are each combined with weights to provide a final estimate of the similarity of this exact rotation instance which covers the above programming and patterns.

Tables VIII-XIV below show examples of different media asset patterns and correlation or similarity scores for an example product (handyman product):

TABLE VIII

Program-level: Fox Nascar and similar programming shows a high correlation with the product purchasers of the handyman product.

| lookup key | Program | corr |
|---|---|---|
| P-1 | FOX NASCAR SPRINT PRE | 0.8358 |
| P-2 | NASCAR SERIES AT DOVER | 0.8357 |
| P-3 | FOX NASCAR SPRINT PRE | 0.8241 |
| P-4 | FOX NASCAR SPRINT SAT | 0.8103 |
| P-5 | FOX SPRINT CUP WNNRS | 0.8036 |
| P-6 | FOX NASCAR SPRNT SAT | 0.7996 |
| P-7 | FOX NASCAR SPRNT WNNR | 0.7905 |
| P-8 | MASH M-F 2 | 0.7901 |
| P-9 | FOX SPRINT CUP PACE LAP | 0.7791 |
| P-10 | FOX NASCAR SPRINT CUP | 0.7787 |

TABLE IX

Genre level: Documentary and news programs score well

| lookup | Genre | Corr |
|---|---|---|
| Q-1 | DOCUMENTARY, GENE | 0.496117 |
| Q-2 | DOCUMENTARY, | 0.489461 |
| Q-3 | NEWS | 0.461017 |
| Q-4 | OFFICIAL POLICE | 0.443524 |

TABLE X

Station level: Media asset patterns TWC, Fox News, and History International score well

| lookup | Station | corr |
|---|---|---|
| S-1 | TWC | 0.683457 |
| S-2 | HI | 0.677207 |
| S-3 | FOXNC | 0.613114 |
| S-4 | CNBC | 0.603963 |
| S-5 | HLMC | 0.584917 |
| S-6 | HIST | 0.563381 |
| S-7 | DIY | 0.563147 |
| S-8 | IMG MEDIA | 0.54394 |
| S-9 | BBCA | 0.523207 |
| S-10 | NGC | 0.511578 |

TABLE XI

Day of week: These persons are most heavily represented in television media during Sunday.

| y | lookup | rownum | weekday | DOW | corr |
|---|---|---|---|---|---|
| 1 | Y-1 | 8575 | 1 | Sunday | 0.298701477 |
| 2 | Y-2 | 8576 | 3 | Tuesday | 0.270696067 |
| 3 | Y-3 | 8577 | 2 | Monday | 0.264775938 |
| 4 | Y-4 | 8578 | 6 | Friday | 0.257218758 |
| 5 | Y-5 | 8579 | 4 | Wednesday | 0.256585593 |
| 6 | Y-6 | 8580 | 5 | Thursday | 0.2562688 |
| 7 | Y-7 | 8581 | 7 | Saturday | 0.201279356 |

TABLE XII

Day-Hour: 6pm is a good time of day to target for these customers.

| lookup | hour | corr | day-hour |
|---|---|---|---|
| a-1 | 1-18.0 | 0.45940398 | Sunday-18.0 |
| a-2 | 3-18.0 | 0.4507812 | Tuesday-18.0 |
| a-3 | 7-18.0 | 0.44892917 | Saturday-18.0 |
| a-4 | 5-18.0 | 0.43370198 | Thursday- |
| a-5 | 1-21.0 | 0.43338671 | Sunday-21.0 |
| a-6 | 2-18.0 | 0.43201616 | Monday-18.0 |
| a-7 | 6-21.0 | 0.42660428 | Friday-21.0 |
| a-8 | 7-21.0 | 0.42047077 | Saturday-21.0 |
| a-9 | 4-18.0 | 0.41009863 | Wednesday- |
| a-10 | 6-18.0 | 0.40573727 | Friday-18.0 |

TABLE XIII

Rotator: History international has rotators that match these customers well.

| lookup | hour | corr |
|---|---|---|
| zzz-1 | HI-Sa-Su + 9a-8p | 0.769536 |
| zzz-2 | HI-M-Su + 8p-12a | 0.760089 |
| zzz-3 | TWC-M-Su + 6a-9a | 0.746814 |
| zzz-4 | FOXNC-M-Su + 6a-9a | 0.728315 |
| zzz-5 | HI-M-F + 6p-8p | 0.714299 |
| zzz-6 | HI-M-F + 3p-6p | 0.708095 |
| zzz-7 | TWC-M-F + 3p-6p | 0.702081 |
| zzz-8 | TWC-Sa-Su + 9a-8p | 0.685666 |
| zzz-9 | TWC-M-F + 6p-8p | 0.683632 |
| zzz-10 | HI-M-F + 9a-3p | 0.667747 |

TABLE XIV

Direct Marketing Association Area (Geographic area): These persons are well-represented in rural areas.

| lookup | DMA | corr |
|---|---|---|
| zzzzzz-2 | BUTIE, MT | 0.348392 |
| zzzzzz-3 | NORTH PLATIE, NE | 0.325346 |
| zzzzzz-4 | MISSOULA, MT | 0.316646 |
| zzzzzz-5 | TWIN FALLS, ID | 0.316364 |
| zzzzzz-6 | Lincoln | 0.316109 |
| zzzzzz-7 | CHEYENNE, WY | 0.314863 |
| zzzzzz-8 | SPOKANE, WA | 0.313262 |
| zzzzzz-9 | BURLINGTON, VT-PQ | 0.309855 |
| zzzzzz-10 | HONOLULU, HI | 0.290508 |

Step 5: Calculate Product-Media Similarity (Using Viewer Panel)

Similar to the preceding discussion, a demographic similarity based on viewer panel can be defined by dv(p,s) where dv is the demographic similarity, p is the product and s is the media.

Step 6: Calculate Contextual Product-Television Station Match

An additional aspect of the current invention is that it is able to utilize keywords to improve the match between the product and media asset. This is done by defining a set of words related to the advertising product, and also defining words related to the media. The match between these two sets of words is then calculated, and this forms an additional source of evidence regarding the quality of the media for targeting the product.

This is done using the following steps:
1. Extract keywords from the media asset. This can be done by (i) extracting text descriptions of programs from the television schedule (eg. as available from a number of sources such as Tribune Media), (ii) extracting text from closed captioning of programs (closed captioning is a system whereby spoken words in the program are transcribed into text which appears on the screen. This can then be captured as part of the broadcast and analyzed), (iii) extracting text from speech-to-text recognition software applied against television programs, (iv) extracting text from structured or semi-structured program or schedule metadata, such as contributors, locations, genres, characters, etc.
2. Calculate the term frequency-inverse document frequency (tf-idf) score for each television media keyword. For each word, set its tf-idf score to be number-of-occurrences/expected-rate-of-occurrence-in-natural-corpus. The expected rate of occurrence in a natural corpus is the rate of occurrence of a word in a corpus such as public domain literature or another source of text. Let this be the program word bag vector.
3. Extract keywords for product. This can be done by analyzing some text descriptions of or metadata about the product. For example, a description of the product can be entered, a URL which has information about the product can be provided, or the user can manually type in distinctive keywords that describe the product (eg. travel luggage might have keywords "travel", "luggage", "bag").
4. Calculate the term frequency-inverse document frequency (tf-idf) score for each of the product keywords, equal to number-of-occurrences/expected-rate-of-occurrence-in-natural-corpus. Let this be the ad bag of words vector.
5. Calculate the match score between the media asset and the product. This can be done by calculating a function of the bag of words vector of the program and the product.
   a. A specific embodiment is be the correlation of log tf-idf scores between the two word vectors.
   b. Another specific embodiment may be to calculate the binomial distribution probability of the two bag-of-words vectors having the same keywords in common.

Step 7: Estimate Historical Product-Television Media Performance

When the product has previously been run on television media (eg. "CNN-AC360-Tues-8 pm") and the performance of that media is available, this information can be incorporated into the prediction for the fitness of the television media to the product. Historical product-television media performance is calculated as a function of the revenue and cost of the media from previous airings.

Historical product-television media performance data is extremely predictive, since if an ad performed well on a specific program and day-time such as "AC360" it will likely perform well on the same program day-time again. However, it is generally the case that historical data is very minimal, since only a tiny fraction of TV media can be directly sampled in this way. In addition, the method for being able to track revenue due to the program is often limited and may include phone numbers or vanity URLs attached to the advertisement, and so not all of the revenue associated with the ad may be tracked. As a result, while this is a useful technique, it is only part of the process for assessing the quality for an upcoming airing.

One specific embodiment that creates a Historical product-media performance estimate is as follows: Tables of historical data for
StationPerformance(StationID,Cost,Revenue,Impressions, RevenuePerImpression,RevenuePerCost),
StationDayPerformance(StationID,Day,Cost,Revenue,Impressions,RevenuePerImpression,RevenuePerCost), StationDayHourPerformance(StationID,Day,Hour,Cost,Revenue,Impressions,RevenuePerImpression,RevenuePerCost), and Program Performance(ProgramID,Cost,Revenue,Impressions,RevenuePerImpression,RevenueperCost)
are created, where each time a particular media asset is used for advertising, the results are recorded into the tables above. This is summarized to create average revenue per impression for each program, station, station-day, etc. For any new upcoming airing, a prediction of performance based on the historical performance of the ad in this same spot can be created as:

$$HistoricalRevenuePerImpressionPrediction = a1 * historicalStationRevenuePerImpression + a2 * StationProgramRevenuePerImpression + a3 * StationDayRevenuePerImpression + a4 * StationDayHourRevenuePerImpression + a5$$

The total impressions for any upcoming spot are estimated separately by using Nielsen rated data or Set top box data using the same summary table method (eg. StationDayHourImpressions, StationImpressions, etc), and then the performance for any upcoming spot is estimated as:

$$HistoricalRevenuePrediction = b1 * ImpressionPrediction * HistoricalrevenuePerImpressionPrediction$$

TABLE VIII

TF-IDF SCORES FOR KEYWORDS ON THE FUSE TELEVISION STATION

| call-letters | Word | Term frequency | Word occurrences | Total occurrences | tfidf |
|---|---|---|---|---|---|
| FUSE | Superstars | 41 | 4 | 321505 | 3295426 |
| FUSE | Missy | 23 | 5 | 321505 | 1478923 |
| FUSE | Gaga | 23 | 5 | 321505 | 1478923 |
| FUSE | Cent | 23 | 6 | 321505 | 1232436 |
| FUSE | Jay-Z | 23 | 8 | 321505 | 924326.9 |
| FUSE | Elliott | 23 | 11 | 321505 | 672237.7 |
| FUSE | Shakur | 4 | 3 | 321505 | 428673.4 |
| FUSE | Tupac | 4 | 3 | 321505 | 428673.4 |

Step 8: Estimate Cost and CPM

An important part of the fitness of a particular media asset is its cost and cost per thousand impressions (CPM). Ideally these will be low. The Cost and CPM estimates for upcoming media can be generated in several ways:

1. Quoted costs and CPM as provided by media publishers: For example television stations can list the cost and CPM rate for their different programs, rotations, and days of the week. These quoted costs may be (a) available electronically in which case they are collected, (b) available after inquiring with the publisher.

2. Estimated costs and CPM: Quoted costs and CPMs may not always be freely available for all media assets, and it may be too costly to contact all publishers. As a result an estimate may be used to "fill in" costs and CPM for as many media assets as possible to identify which ones to potentially narrow in on and purchase. In order to create these estimates, a variety of data providers maintain historical data on costs and CPMs for different media placements. In addition, the advertiser may also have purchased media before, and these costs and CPMs are also available. These can be used to forecast the future costs and CPMs. A method that can be used for forecasting cost and CPM is similar to that described in Step 7, which is to define the following summary tables:
StationPerformance(StationID,Cost,Revenue,Impressions, RevenuePerImpression,RevenuePerCost),
StationDayPerformance(StationID,Day,Cost,Revenue,Impressions,RevenuePerImpression,RevenuePerCost), StationDayHourPerformance(StationID,Day,Hour,Cost, Revenue,Impressions,RevenuePerImpression,RevenuePerCost), and Program Performance(ProgramID,Cost,Revenue,Impressions,RevenuePerImpression,RevenueperCost).

Each time a particular media asset is used for advertising, the results are recorded into these tables. Historical data is also collected from data providers who monitor CPM and Costs of media. This is summarized to create average cost per impression and cost for each program, station, station-day, etc. For any new upcoming airing, a prediction of performance can be created based on the historical performance of the ad in this same spot as:

$$\text{HistoricalCostPerImpressionPrediction}(s) =$$
$$c1 * \text{historicalStationCostPerImpression}(s) +$$
$$c2 * \text{StationProgramCostPerImpression}(s) +$$
$$c3 * \text{StationDayCostPerImpression}(s) +$$
$$c4 * \text{StationDayHourCostPerImpression}(s) + c5$$

$$\text{CPM}(s) = 1000 * \text{HistoricalCostPerImpressionPrediction}(s)$$

$$\text{Cost}(s) = \text{HistoricalCostPerImpressionPrediction}(s) * \text{historicalImpressionPrediction}(s)$$

Step 9: Purchase Television Media Using Similarity

In order to purchase media, a media buyer would purchase media with a high fitness score, where fitness is defined below:

Fitness(p,s)=f(d(p,s), Cost(s), CPM(s), historicalImpressionPrediction(s), historicalRevenuePrediction (p,s), ContextualMatch(p,s), dv(p,s)), where p is the product, s is the media asset, d(p,s) is the demographic similarity between the product and media, Cost(s) is the cost of the media, CPM(s) is the cost per thousand impressions of the media, historicalRevenuePRediction(p,s) is the predicted revenue of the product were it to be advertised in the media s, ContextualMatch(p,s) is the word vector match between the product and media, and dv(p,s) is the demographic similarity of a viewer panel.

A. Purchase Using Target Impressions and Target CPM

A specific embodiment of the current invention is using a metric defined as "target CPM" (tCPM) in order to produce an effective targeted media buy. This is a fitness function as defined above, but with some specific selections around the function form. This is defined as follows:
1. The similarity function dv(p,s) is equal to the correlation coefficient between the product and media demographic vectors.
2. Fitness(p,s)=Cost(s)/(if(dv(p,s)<0 then 0.0 else dv(p, s))*HistoricalImpressionPrediction(s))=tCPM The quantity dv(p,s)*HistoricalImpressionPrediction(s) provides a measure of the percentage of the sqrt(variance) in the product vector accounted for by this media asset (ignoring negative correlations). The tool can now sort the media in order of tCPM since this corresponds to media with the best value per dollar.

B. Purchase Using Percent of Budget

Another specific embodiment of the current invention in terms of purchasing media, is to define a "percent of budget" that should be ideally allocated to a set of media assets. This is a fitness function as defined above, but with some specific selections around the function form. This is defined as follows:

$$\text{Fitness}(p,s) = tCPM(p,s)/\text{Sum}S(tCPM(p,S))$$

C. Purchase Using Cluster Multi-Targeting:

One other specific embodiment to purchase media is what called "cluster multi-targeting". If the overall product profile (the average) were targeted, the result may be a targeted profile that either has very few customers behind it, or which favors one cluster over the others. For example, male, high-income programming might be favored, but there are actually clusters including females which won't be addressed.

In one embodiment to purchase media, all of the clusters can be targeted simultaneously by aggregating the underlying segments together to form an overall tratio and timp based on the quality of the match for each segment. This can be done as follows.

$$\text{Fitness}(p,s) = \text{cost}(s)/timp(p,s)',$$

where $$Timp(p,s)' = \text{Sum over } c(timp(p,s) * \text{membership }\%(c))$$

$$Imp(p,s)' = \text{Sum over } c(imp(p,s) * \text{membership }\%(c))$$

$$Tratio(p,s)' = timp(p,s)/imp(p,s).$$

In another embodiment, the system first sorts by cluster, tcpm and assigns a rank-within-cluster, so that the results for cluster 1 have rank 1 . . . R, and the results for cluster 2 also have ranks 1 . . . R. The system then sorts again by rank alone, so that the top results for cluster 1, 2, and 3 are grouped together, and then the second best for 1, 2, 3, and so on. The result is that the system simultaneously targets all clusters.

D. Purchase Using Revenue Estimate

Another specific embodiment is to purchase media based on its estimated revenue prediction. This is a fitness function as defined above, but where the fitness function parameters were estimated to minimize the squared error between predicted revenue and actual revenue produced by the media.

$$\min(\text{Fitness}(p,s) - \text{Revenue}(p,s))^2$$

E. Purchase Using ROI Optimization

Another specific embodiment is for the system to select media to purchase based on the following constraints:
max Revenue subject to PredictedRevenue/Cost>minROI and PredictedCost<=Budget The algorithm for solving the above optimization problem is as follows:
1. Budget=0; PredictedRevenue=0; s={ } (empty set); BestSolution { } (empty set)
Repeat steps 2 through 6 below until PredictedRevenue/PredictedCost>ROAS or PredictedCost>Budget
2. Set Bestsolution=Bestsolution U {s}
3. Pick medias from the set of all available media S: max PredictedRevenue(p,s)/PredictedCost(s)
4. PredictedRevenue=PredictedRevenue+PredictedRevenue(p,s)
5. PredictedCost=PredictedCost+PredictedCost(s)
6. Remove the selected media from the set of remaining media S=S-{s} Return BestSolution F. "Autopilot" Feature and Automated ROI Optimization Another embodiment is to provide a list of recommended media. The user may then accept/reject or edit the list of recommended media. Secondly, if the user has given the system the authority to do so, the system may proceed and purchase the media on its own.

Reasons for Recommending Media Assets

Rather than just present a set of media assets to potentially purchase with fitness score alone, the system can also provide the reason certain media assets are being suggested. When prompted by the user, the system will do the following: list the N components of the covariance matrix between p and s which have the highest magnitude, ie. show the set of demographic attributes {i}: largest N from |p(i)*s(i)|

Intuitively these components exerted the greatest influence in driving the match score, and so are the "reasons" why the media was selected. Table XV shows an example of the program feature that provides reasons for explaining why certain programming was recommended. The product in this case was the handyman tool product. The product was only matched on a small number of variables, but it shows the reason why each program was selected—for example, the top match "FOX NASCAR SPRINT PRE" was recommended because this has a strong positive match with the product on the demographic "perHH-P55-64" or persons aged 55-64. For a 400-variable match, this feature would be even more useful. Using this feature, users can uncover why a certain media asset was recommended, obtain more confidence in why the media is being recommended, and they can decide if they agree with the recommendation or would like to change it.

TABLE XV

REASONS CERTAIN MEDIA ASSETS ARE RECOMMENDED FOR ADVERTISING

| lookup key | Program | Corr | why | cov |
|---|---|---|---|---|
| P-1 | FOX NASCAR SPRINT PRE | 0.8358 | perHH-P55-64 | 0.3385818 |
| P-2 | NASCAR SERIES AT DOVER | 0.8357 | perHH-P55-64 | 0.5546946 |
| P-3 | FOX NASCAR SPRINT PRE SAT | 0.8241 | perHH-P55-64 | 0.4557614 |
| P-4 | FOX NASCAR SPRINT SAT PRE | 0.8103 | perHH-P55-64 | 0.4509219 |
| P-5 | FOX SPRINT CUP WNNRS CIRC | 0.8036 | perHH-MaleAdult | 0.3706025 |
| P-6 | FOX NASCAR SPRNT SAT WNNR | 0.7996 | perHH-P55-64 | 0.3920339 |
| P-7 | FOX NASCAR SPRNT WNNR SAT | 0.7905 | perHH-P55-64 | 0.4054008 |
| P-8 | MASH M-F 2 | 0.7901 | perHH-P55-64 | 0.5861894 |
| P-9 | FOX SPRINT CUP PACE LAP | 0.7791 | perHH-MaleAdult | 0.4735653 |
| P-10 | FOX NASCAR SPRINT CUP PST | 0.7787 | perHH-P55-64 | 0.1984156 |

Table XVI below shows the final set of television airings that the system is recommending buying. This is based on scanning the upcoming television guide (as described in the data feed setup), and assigning a fitness score to each upcoming airing, and then presenting the programs in order of fitness:

TABLE XVI

EXAMPLES OF TELEVISION AIRINGS RECOMMENDED BY THE SYSTEM FOR PURCHASE

| Fitness Score | Program | Station | Station Score | Start Date | End Date | Rotation | Rotation Score | Day of Week | Day of Week Score | Hour of Day | Hour of Day Score |
|---|---|---|---|---|---|---|---|---|---|---|---|
| 0.6419 | Ritmo Deportivo | | | 8/14/2011 4:30 PM | 8/14/2011 5:00 PM | Sa + Su + 9a + 8p | | Sun | 0.5575 | 3-6 PM | (0.4558) |
| 0.6419 | Ritmo Deportivo | | | 8/21/2011 4:30 PM | 8/21/2011 5:00 PM | Sa + Su + 9a + 8p | | Sun | 0.5575 | 3-6 PM | (0.4558) |
| 0.6262 | Descontrol | | | 8/13/2011 5:00 PM | 8/13/2011 6:00 PM | Sa + Su + 9a + 8p | | Sat | 0.3124 | 3-6 PM | (0.4558) |
| 0.6262 | Descontrol | | | 8/20/2011 5:00 PM | 8/20/2011 6:00 PM | Sa + Su + 9a + 8p | | Sat | 0.3124 | 3-6 PM | (0.4558) |
| 0.6239 | Entourage | | | 8/16/2011 4:30 AM | 8/16/2011 5:00 AM | M + Su + 12a + 6a | | Tue | (0.2831) | 3-6 AM | 0.4971 |
| 0.6239 | Entourage | | | 8/13/2011 4:30 AM | 8/13/2011 5:00 AM | M + Su + 12a + 6a | | Sat | 0.3124 | 3-6 AM | 0.4971 |
| 0.6239 | Entourage | | | 8/12/2011 4:30 AM | 8/12/2011 5:00 AM | M + Su + 12a + 6a | | Fri | (0.6910) | 3-6 AM | 0.4971 |
| 0.6239 | Entourage | | | 8/17/2011 4:30 AM | 8/17/2011 5:00 AM | M + Su + 12a + 6a | | Wed | (0.4429) | 3-6 AM | 0.4971 |
| 0.6239 | Entourage | | | 8/19/2011 4:30 AM | 8/19/2011 5:00 AM | M + Su + 12a + 6a | | Fri | (0.6910) | 3-6 AM | 0.4971 |
| 0.6239 | Entourage | | | 8/25/2011 4:30 AM | 8/25/2011 5:00 AM | M + Su + 12a + 6a | | Thu | (0.4277) | 3-6 AM | 0.4971 |

Example of Media Buying Using Product-Spot Similarity

FIG. 1.12 and FIG. 1.13 show the number of phone orders received per advertisement airing and its dependence upon similarity scores. Both plots indicate an increase in revenue per airing as demographic similarity increases (more negative scores). As a result, as television media becomes more An example of media buying would be to 1. Determine the desired Media Efficiency Ratio (revenue/cost ratio)
2. Look up Table XVII for the desired MER, and read-off the similarity threshold.
3. Buy all media assets that have this similarity or better.

TABLE XVII

SIMILARITY THRESHOLD VS ADVERTISING PERFORMANCE

| d | mean(orders) \| similarity < d | mean(orders) \| similarity > d | p-value orders (Wilcoxon) | n \| similarity < d | Ratio of means | Cost \| similarity < d (prop of total) |
|---|---|---|---|---|---|---|
| −0.2646 | 2.475 | 0.2581 | 0.0986 | 2 | 9.59 | 0.24 |
| −0.2469 | 1.8167 | 0.2488 | 0.0534 | 3 | 7.30 | 0.37 |
| −0.1764 | 1.6958 | 0.2054 | 0.0105 | 4 | 8.26 | 0.44 |
| −0.1651 | 1.3567 | 0.2139 | 0.0678 | 5 | 6.34 | 0.45 |
| −0.1313 | 1.1722 | 0.2124 | 0.0785 | 6 | 5.52 | 0.53 |
| −0.1267 | 1.0966 | 0.1928 | 0.0246 | 7 | 5.69 | 0.53 |
| −0.1035 | 1.022 | 0.1782 | 0.0114 | 8 | 5.74 | 0.53 |
| −0.0988 | 0.9202 | 0.1818 | 0.0189 | 9 | 5.06 | 0.59 |
| −0.0682 | 0.8281 | 0.1914 | 0.0601 | 10 | 4.33 | 0.60 |
| −0.0153 | 0.7529 | 0.202 | 0.1484 | 11 | 3.73 | 0.65 |
| 0.0069 | 0.7214 | 0.1918 | 0.1079 | 12 | 3.76 | 0.67 |
| 0.0097 | 0.6902 | 0.1841 | 0.0839 | 13 | 3.75 | 0.69 |
| 0.0099 | 0.6409 | 0.1964 | 0.1817 | 14 | 3.26 | 0.75 |
| 0.0192 | 0.6297 | 0.1766 | 0.108 | 15 | 3.57 | 0.76 |
| 0.0208 | 0.6008 | 0.1773 | 0.1063 | 16 | 3.39 | 0.79 |
| 0.0219 | 0.5654 | 0.1921 | 0.2149 | 17 | 2.94 | 0.82 |
| 0.0238 | 0.542 | 0.1966 | 0.2254 | 18 | 2.76 | 0.82 |
| 0.0265 | 0.5134 | 0.2162 | 0.4049 | 19 | 2.37 | 0.84 |
| 0.0298 | 0.4878 | 0.2403 | 0.6599 | 20 | 2.03 | 0.84 |
| 0.034 | 0.4645 | 0.2703 | 0.9798 | 21 | 1.72 | 0.84 |
| 0.0389 | 0.4434 | 0.3089 | 0.7113 | 22 | 1.44 | 0.84 |
| 0.0432 | 0.4467 | 0.274 | 0.9555 | 23 | 1.63 | 0.87 |
| 0.0639 | 0.4409 | 0.2672 | 0.8574 | 24 | 1.65 | 0.87 |
| 0.065 | 0.4233 | 0.334 | 0.7678 | 25 | 1.27 | 0.90 |
| 0.0756 | 0.407 | 0.4454 | 0.3342 | 26 | 0.91 | 0.90 |
| 0.0833 | 0.3919 | 0.6681 | 0.0549 | 27 | 0.59 | 0.95 | similar to the target product, revenue per airing increases. Table XVII shows similarity versus revenue per airing. The table is sorted by the similarity score from most similar (most negative score) to least similar (most positive score). This table can be used to decide if there is a similarity threshold for which an advertisement is placed. The variable d is the similarity score, mean(orders) is the mean number of order placed, and n is the number of stations on which an advertisement is run to produce the results in this table. For a similarity of around −0.06, the lower similarity stations out-perform the others with around 4.2× better performance in terms of orders per spot. This difference is also statistically significantly as measured using a Wilcoxon rank sum test (this test looks at the comparative ranks of station performance and notes the probability that ranks from one group would appear consistently ahead of the other). A large amount of television station inventory is available at this threshold. In the media campaign used to generate Table XVII, 60% of the budget spent on advertising was spent on stations this good or better.

A company looking for maximum performance could achieve even better results however. It could restrict its media campaign to only the most similar television stations to the product. If this strategy is pursued, in one scenario, similarities <−0.20 can be used. In this case a 7.3× performance gain might be achieved in terms of orders per spot. At this significantly higher performance, 36% of the media budget can be spent on this higher performing inventory. This is still a very high amount of spend, given that the television assets are so much higher performing.

Because there are so many different variables that can be used to build a fitness model, a model management infrastructure can be useful. The management infrastructure assigns a unique model identification code to each fitness model. The estimates for a particular fitness model can be tested against other models to determine which model performs better.

Fitness predictions can be recorded in a schema as FitnessPredictionProduction (ProjectKey, MedialnstanceID, Date, Time, MediaAssetID, Score) tuples. This representation is used to avoid moving code during a new fitness model release.

A second area—a modeling schema—is maintained where predictions are generated, and simultaneously flight multiple fitness models. The code in this area may not meet the same standard as for the production system. The code is available to analysts and can be modified in order to develop new models.

In this schema results are written as FitnessPrediction (ProjectKey, MedialnstanceID, Date, Time, MediaAssetID, ModelID, Score). Another table, FitnessModel (modelid, Description) keeps track of the fitness model that has been enabled for each project.

The production system performs two steps. First, it runs a default fitness model in production which populates a set of Fitness predictions. This code is designed to be reliable and is changed on a slower time-scale. Next, it then joins to the underlying FItnessPrediction table to retrieve model results. If model results are available in the proper format it will retrieve these results and use them in production. Every day FitnessPrediction is archived in a FitnessPredictionHistory table to ensure that model results can be tracked over time.

In the modeling schema area, it is possible to run multiple models in parallel, record their predictions, preview different models prior to release, and so on.

As a result of this architecture, releasing a new fitness model can be achieved without moving any code into the production system—keeping it safe and appropriately isolated while still allowing rapid iteration on models through a controlled interface. Eventually the new models should be migrated to become the new default model in production, however operationally new models can be deployed and used in production for extended periods of time, and then productized when needed. This increases reliability and model release speed and simultaneously supports prototyping and model development which occurs in parallel with the production model. Examples of Results Provided by an Automated Program Finder An automated program finder can be used to implement the techniques described above.

FIG. 2 shows an example screenshot of different segments that can be targeted using the program finder. The program finder is using data that corresponds to a product project code-named Jawhorse. Natural clusters 1-3 are clusters generated unsupervised clustering. Other targeted segments have also been passed into the program finder by the client, such as infomercial purchase type, retail purchase type, and retail website purchase type. Any of these segments are targetable.

FIG. 3 shows an example result produced by the program finder for rotation media assets. The program finder was set to use a "rotation" media asset pattern where the station designates a window of time over a number of designated days that includes more than one program, and the station decides when an advertisement will run within that time window. Additionally, the program finder used an overall segment, rather than particular client-specified segments or natural clustering. The result includes 14 ranked media asset patterns.

Figure 4:
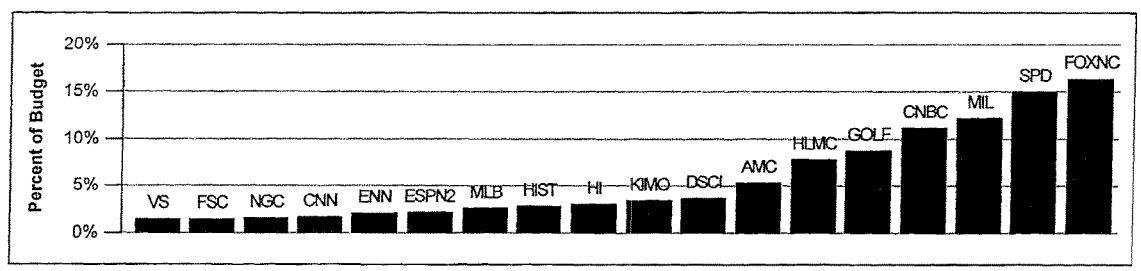
FIG. 4 shows an example allocation of an advertising budget to program stations.

FIG. 4 shows an example recommended allocation of an advertising budget to particular program stations for the product "Jawhorse". The allocation is based on ratecard cost and assumes a linear value function based on correlation coefficient. Ratecard cost is media cost as monitored by a third-party rating agency, such as SQAD, or an initial starting price cost that is defined by the publisher that is selling the media for advertising, per-negotiation.

Figure 5:
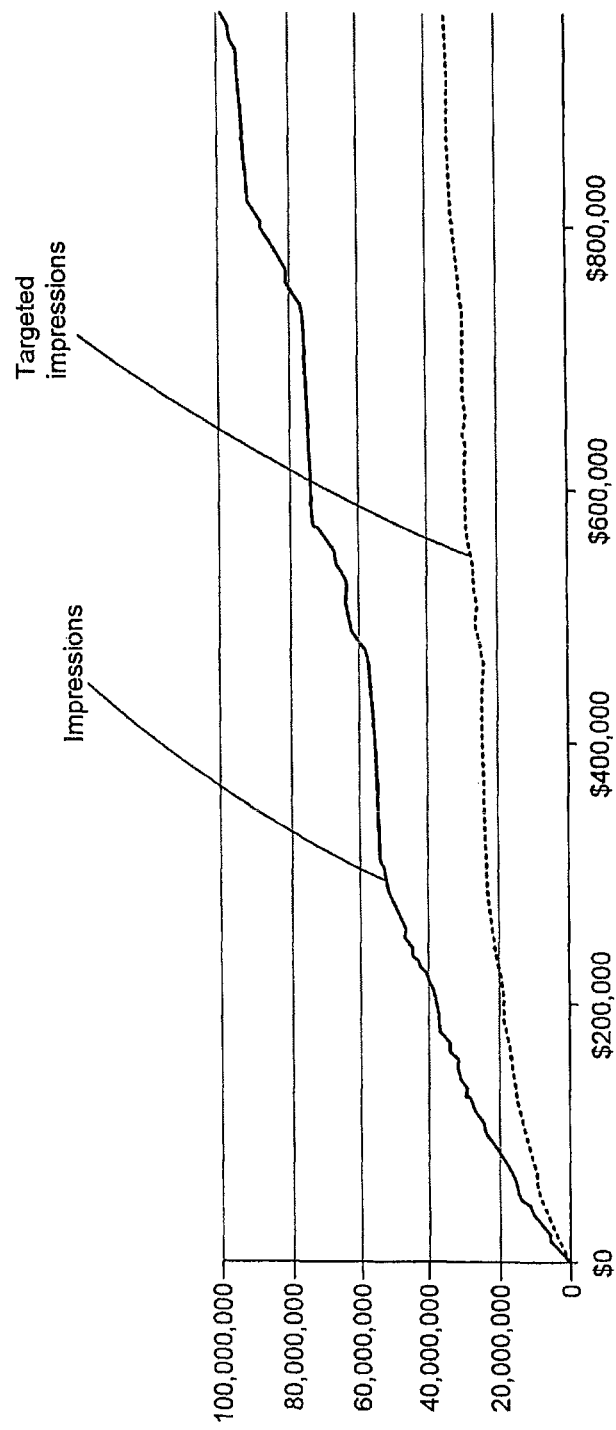
FIG. 5 shows an example graph of targeted impressions and impressions as an increasing number of media assets are added to the advertising purchase.

FIG. 5 shows an example of graph of targeted impressions and impressions as an increasing number of media assets are added to the advertising purchase. As less-well-targeted programming is added, the ratio between targeted and untargeted impressions decreases.

Figure 6:
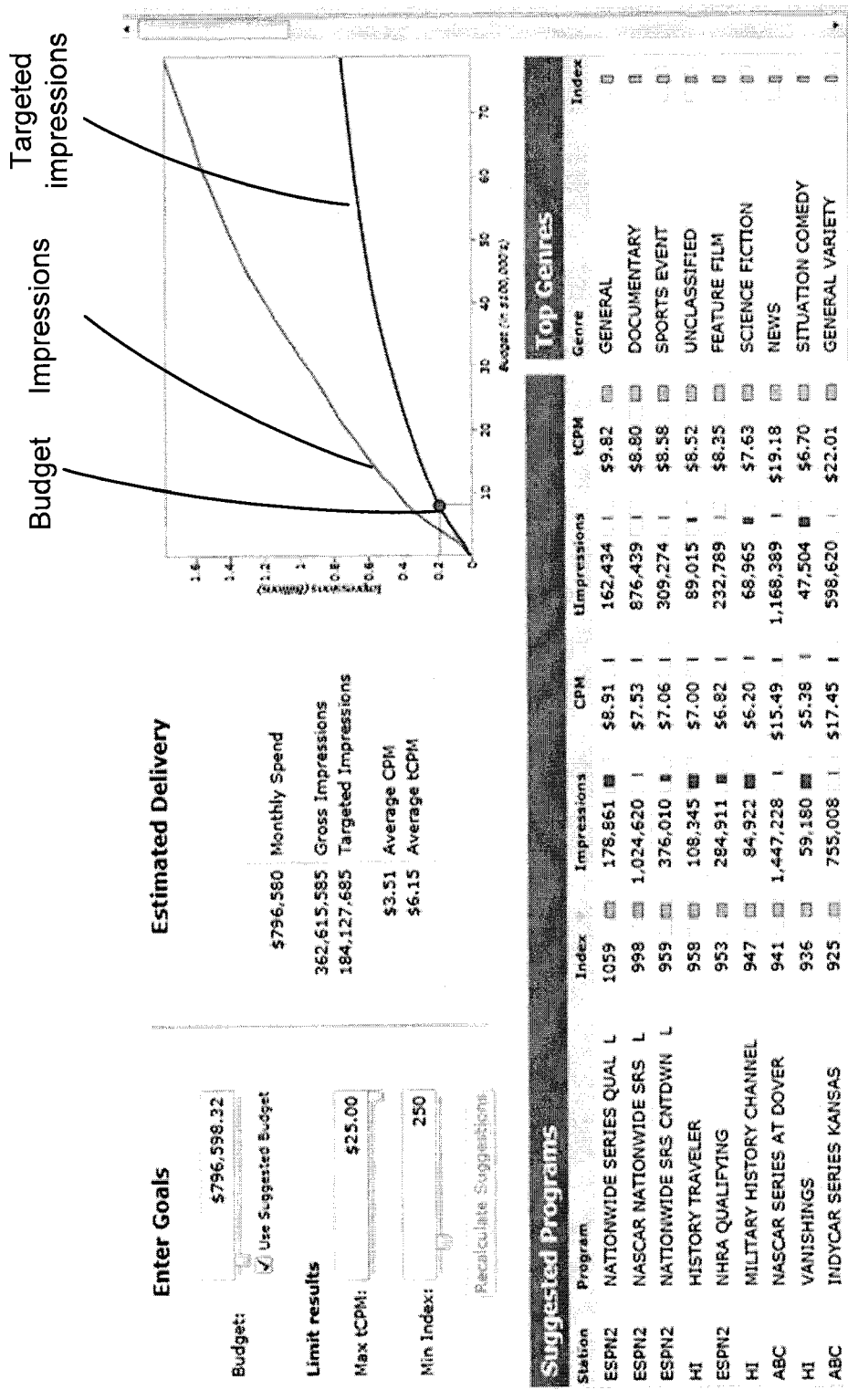
FIG. 6 shows an example screenshot of a program finder result that includes a graph of targeted impressions and impressions for a given budget level and a sortable list of suggested programs.

FIG. 6 shows an example screenshot of a program finder result. The result includes a graph of targeted impressions and impressions for a given budget level. The system automatically calculates the inflection point in the budget where the best ratio of targeted impressions to impressions is achieved, above which the targeted impressions have diminishing returns.

The result also includes a sortable list of suggested programs. The list is sortable in order of targeting ratio (tratio) which is the most relevant programming or the programming with the closest vector match. The list is also sortable in order of target cost per thousand impressions (tCPM) which is the media with the best target impressions per dollar spent. Media buyers typically buy based upon tCPM. The list can also be sorted by revenue estimate (not shown).

Figure 7:
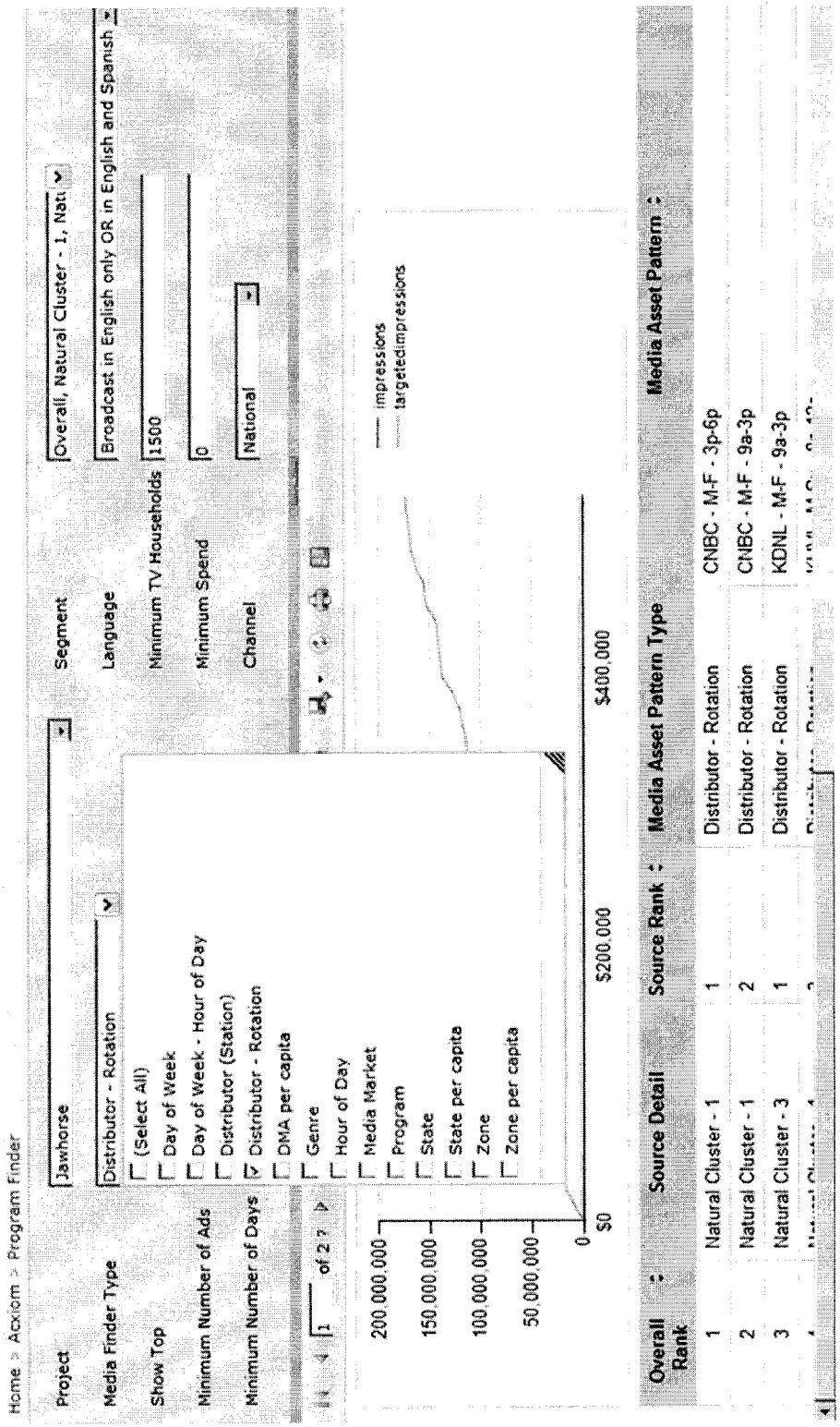
FIG. 7 shows an example screenshot showing different media asset patterns that can be compared to a product.

FIG. 7 shows an example screenshot showing different media asset patterns that can be compared to the product. The match scores for each of these media asset patterns are combined to form a final score. The match scores in FIG. 7 are in columns to the right which are off-screen.

Figure 8:
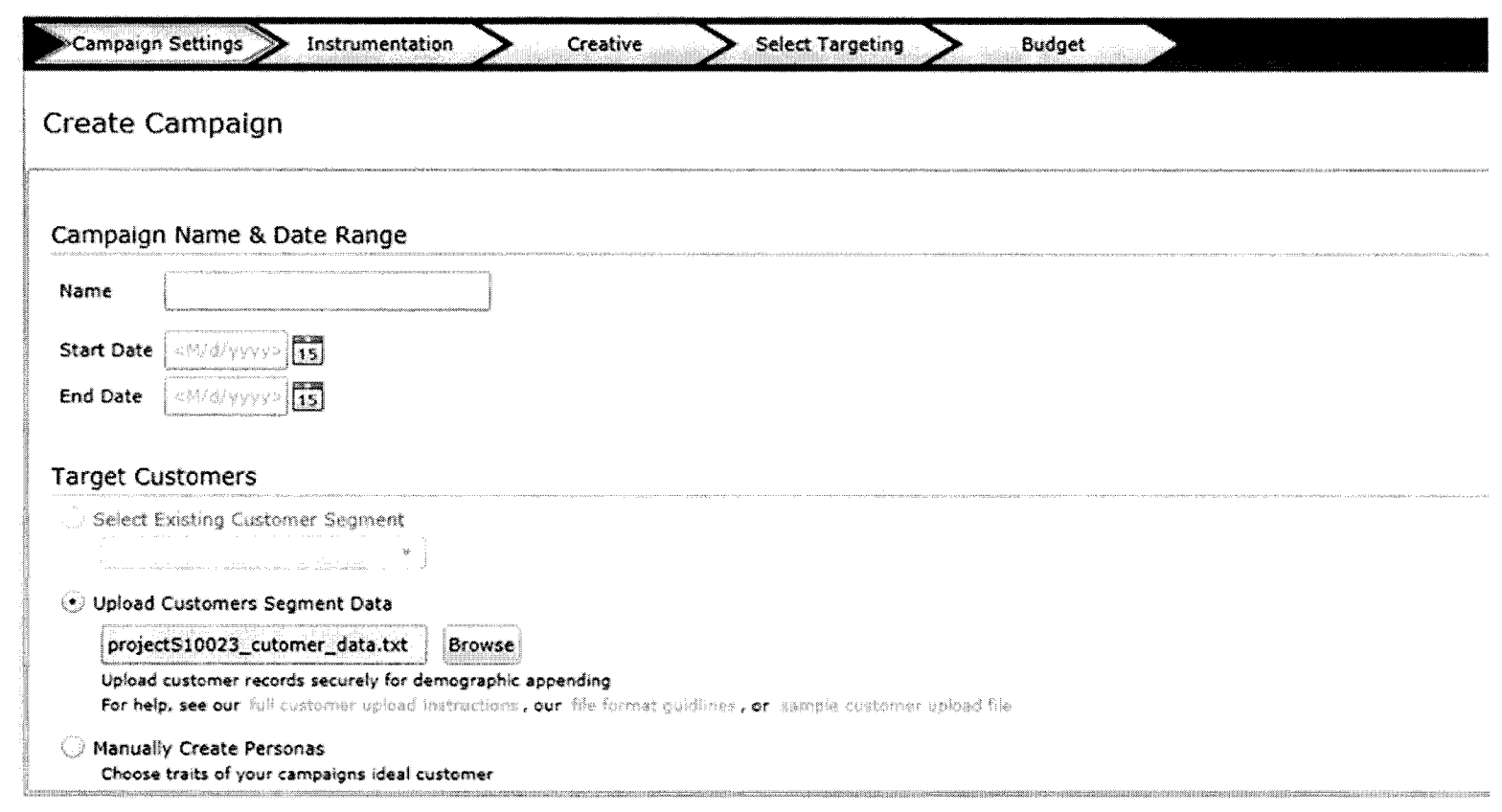

FIG. 8 shows an example screenshot of how customer records are input to the program finder. The user can select whether to upload customer names and addresses or whether to manually type in the profile to be targeted. If the user uploads a customer name-address file, it is automatically enriched to obtain demographic information, and then a product vector is generated for matching to media.

Figure 9:
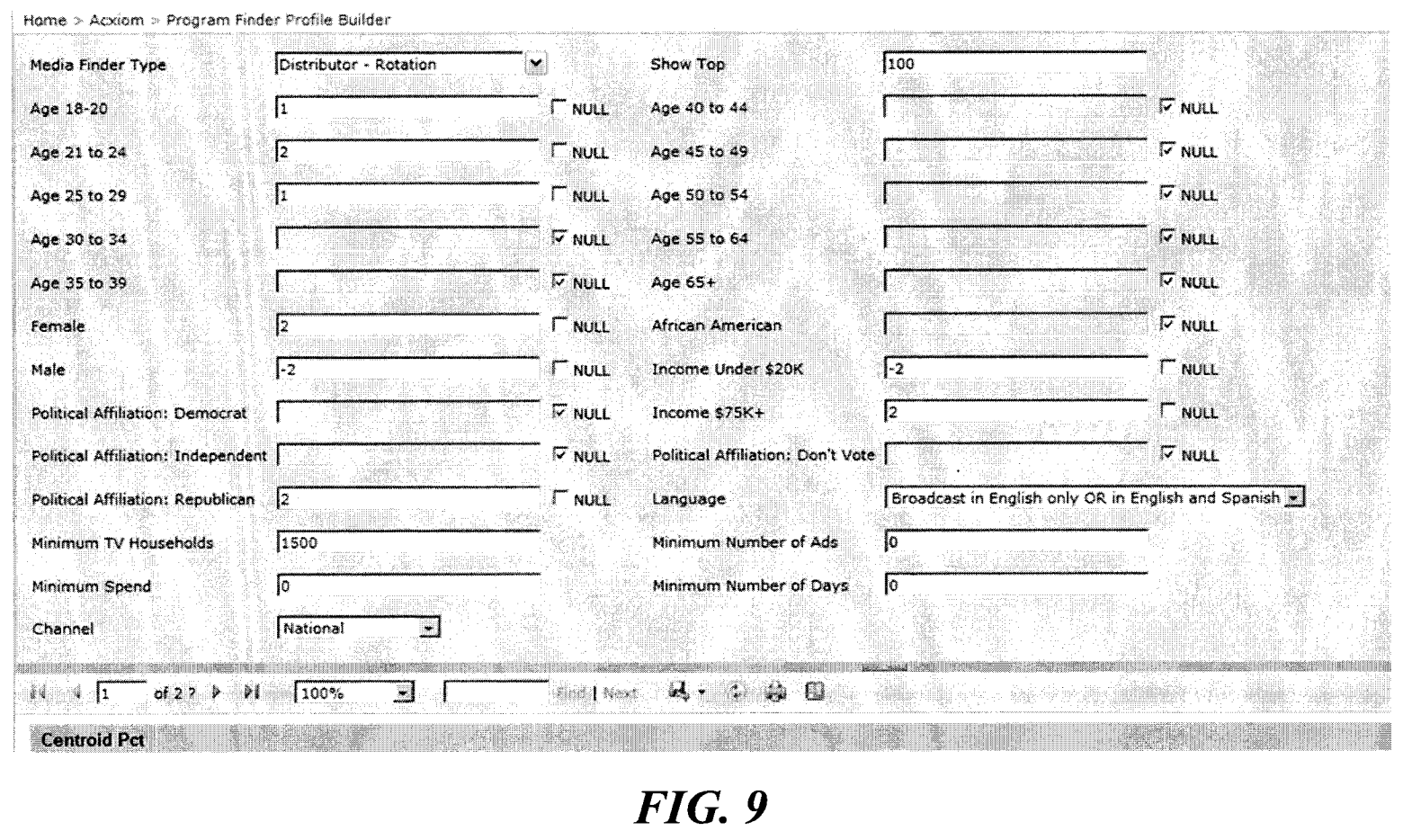

FIG. 9 shows an example screenshot of a program finder profile builder. The profile customer targeted in this example is a high income republican female in her 20's. Other variables can also be selected from a list of 400 variables, such as car ownership, interest in science fiction, etc. After entering the desired customer profile, all programming that matches this type of customer can be identified based on linked buyers or viewer records. While the program finder permits a user to manually enter a customer profile for targeting, the typical method is for the program finder to automatically ingest customer address records, enrich the records with demographics, and then summarize the records into a demographic vector that is based on actual buyers.

FIG. 10 shows an example result of top media asset rotations determined by the program finder for a targeted customer having the following characteristics: high income, republican, female, in her 20's.

FIG. 11 shows an example program finder result corresponding to program media asset patterns.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

We claim:

1. A computer-implemented method for matching an advertisement to a television media asset comprising:
    extracting at least one keyword from a web page associated with the advertisement;
    generating a profile for the web page comprising the at least one extracted keyword;
    generating a plurality of media asset profiles corresponding to a plurality of television media assets, each media asset profile including at least one media asset keyword for a corresponding television media asset;
    calculating, for each television media asset, a match score based on the at least one media asset keyword and the at least one extracted keyword;
    calculating, for the profile for the web page, a plurality of fitness scores based at least in part on the match score for each television media asset; and
    determining a particular television media asset for placing an advertisement based upon the plurality of fitness scores.

2. The method of claim 1, further comprising one of the following:
    displaying the fitness scores as part of a media asset schedule; displaying the fitness scores and upper and lower confidence bounds of the fitness scores as part of a media asset schedule; displaying the fitness scores superimposed on the media asset schedule; and displaying forecast fitness scores and actual fitness scores on the media fitness schedule.

3. The method of claim 1, wherein the profile for the web page further comprises a demographic profile for the web page based on visitors of the web page, wherein each media asset profile further comprises a media demographic profile for a television media asset based upon viewer demographic information, and wherein the fitness scores are calculated based upon the match scores and upon demographic similarity measures between the demographic profile for the web page and the media demographic profiles for the plurality of television media assets.

4. The method of claim 3, wherein the demographic profile for the web page and the media demographic profiles for the plurality of television media assets are weighted differentially.

5. The method of claim 3, further comprising one of the following: transforming the media demographic profiles of the plurality of television media assets to be compatible with the demographic profile for the web page, or transforming the demographic profile of the web page to be compatible with the media demographic profiles of the plurality of television media assets, wherein information for determining the plurality of media demographic profiles and the demographic profile for the web page come from different sources.

6. The method of claim 1, wherein the fitness scores are further based on at least one of historical media performances between the plurality of television media assets and the web page or historical media costs for the plurality of television media assets.

7. The method of claim 1, further comprising:
    automatically extracting the one or more media asset keywords for the plurality of television media assets, wherein the media asset keywords for a television media asset are extracted from at least one of closed captioning text associated with the television media asset, a program schedule description associated with the television media asset, or speech-to-text conversion for program content of the television media asset.

8. The method of claim 3, wherein generating the profile for the web page comprises:
    automatically selecting previous visitors of the web page using a plurality of visitor records from previous visitors of the web page;
    concatenating a plurality of enriched visitor records for the previous visitors based on adding visitor demographic information to the plurality of visitor records, wherein the visitor demographic information comprises a plurality of variables; and
    creating the demographic profile for the web page from the plurality of enriched visitor records, the demographic profile for the web page comprising automatically scored target demographics for the web page based at least in part on a combination of the visitor demographic information from the plurality of enriched visitor records.

9. The method of claim 3, further comprising:
    providing most significant matching or most significant mis-matching demographics between the demographic profile for the web page and the media demographic profiles.

10. The method of claim 3, further comprising:
assigning a unique identification code to each of a plurality of media asset fitness models;
testing media asset fitness models of the plurality of media asset fitness models against other media asset fitness models; and
tracking results of the testing using the unique identification codes.

11. The method of claim 1, wherein the fitness scores are further based upon a demographic similarity determined by calculating a function based on a first demographic of visitors of the web page and a second demographic of linked television customers, wherein one or more linking keys permit television viewing activities to be tracked.

12. The method of claim 11, wherein the linked television customers visited the web page by one of the following methods: accessing a uniform resource locator (URL) that was provided by a television advertisement; or redeeming a special offer that was provided by a television advertisement.

13. The method of claim 11, wherein demographic information about the linked television customers is automatically appended with additional information for use in determining similarity.

14. The method of claim 1, wherein the fitness scores are further based upon a demographic similarity determined by calculating a function based on a first demographic of visitors of the web page and a second demographic of a television viewing panel, wherein the television viewing panel permits television viewing activities to be tracked.

15. The method of claim 1, wherein the plurality of television media assets are selected from the following: a television station, a television media asset in a particular geographic location, a television media asset program, a television media asset on a particular day, a television media asset running at a particular hour, or a television media asset running at a particular minute.

16. The method of claim 1, further comprising estimating a value of a television media asset as an advertisement vehicle for bidding on an auction for advertising with the television media asset.

17. A system for matching an advertisement to a television media asset, the system including:
a data storage device that stores instructions for matching an advertisement to a television media asset; and
a processor configured to execute the instructions to perform a method including:
extracting at least one keyword from a web page associated with the advertisement;
generating a profile for the web page comprising the at least one extracted keyword;
generating a plurality of media asset profiles corresponding to a plurality of television media assets, each media asset profile including at least one media asset keyword for a corresponding television media asset;
calculating, for each television media asset, a match score based on the at least one media asset keyword and the at least one extracted keyword;
calculating, for the profile for the web page, a plurality of fitness scores based at least in part on the match score for each television media asset; and
determining a particular television media asset for placing an advertisement based upon the plurality of fitness scores.

18. The system of claim 17, wherein the profile for the web page further comprises a demographic profile for the web page based on visitors of the web page, wherein each media asset profile further comprises a media demographic profile for a television media asset based upon viewer demographic information, and wherein the fitness scores are calculated based upon the match scores and upon demographic similarity measures between the demographic profile for the web page and the media demographic profiles for the plurality of television media assets.

19. The system of claim 18, wherein the demographic profile for the web page and the media demographic profiles for the plurality of television media assets are weighted differentially.

20. A non-transitory computer-readable storage medium for matching an advertisement to a television media asset, the non-transitory computer-readable medium having instructions that, when executed by a processor, cause the processor to perform the operations comprising:
extracting at least one keyword from a web page associated with the advertisement;
generating a profile for the web page comprising the at least one extracted keyword;
generating a plurality of media asset profiles corresponding to a plurality of television media assets, each media asset profile including at least one media asset keyword for a corresponding television media asset;
calculating, for each television media asset, a match score based on the at least one media asset keyword and the at least one extracted keyword;
calculating, for the profile for the web page, a plurality of fitness scores based at least in part on the match score for each television media asset; and
determining a particular television media asset for placing an advertisement based upon the plurality of fitness scores.

* * * * *